US012711718B2

(12) United States Patent
Tan et al.

(10) Patent No.: US 12,711,718 B2
(45) Date of Patent: Aug. 18, 2026

(54) ANOMALY TRACKING SYSTEM AND METHOD USING ENTERPRISE DIGITAL TWINS BASED MIXED REALITY

(71) Applicant: GridRaster, Inc., Mountain View, CA (US)

(72) Inventors: Yiyong Tan, Mountain View, CA (US); Bhaskar Banerjee, Mountain View, CA (US); Rishi Ranjan, Mountain View, CA (US)

(73) Assignee: GridRaster, Inc., Mountain View, CA (US)

( * ) Notice: Subject to any disclaimer, the term of this patent is extended or adjusted under 35 U.S.C. 154(b) by 113 days.

(21) Appl. No.: 18/922,307

(22) Filed: Oct. 21, 2024

(65) Prior Publication Data

US 2026/0030845 A1 Jan. 29, 2026

Related U.S. Application Data

(63) Continuation-in-part of application No. 17/711,695, filed on Apr. 1, 2022, now Pat. No. 12,387,435, and a continuation-in-part of application No. 17/575,091, filed on Jan. 13, 2022, now Pat. No. 12,125,146, which is a continuation of application No. 17/320,968, filed on May 14, 2021, now Pat. No. 11,250,637.

(51) Int. Cl.

| | |
|---|---|
| ***G06T 19/00*** | (2011.01) |
| ***G06F 18/25*** | (2023.01) |
| ***G06N 3/045*** | (2023.01) |
| ***G06N 5/04*** | (2023.01) |
| ***G06N 20/10*** | (2019.01) |

(52) U.S. Cl.

CPC ........... *G06T 19/006* (2013.01); *G06F 18/25* (2023.01); *G06N 3/045* (2023.01); *G06N 5/04* (2013.01); *G06N 20/10* (2019.01)

(58) Field of Classification Search

CPC ...... G06T 19/006; G06N 20/10; G06N 3/045; G06N 5/04; G06F 18/25

See application file for complete search history.

(56) References Cited

U.S. PATENT DOCUMENTS

| | | | |
|---|---|---|---|
| 931,349 | A | 8/1909 | Sietto |
| 6,160,808 | A | 12/2000 | Maurya |
| 8,126,985 | B1 | 2/2012 | Kandekar et al. |
| 9,313,491 | B2 | 4/2016 | Chiu |
| 9,677,840 | B2 | 6/2017 | Rublowsky |
| 10,075,563 | B2 | 9/2018 | Ranjan et al. |
| 10,867,217 | B1 | 12/2020 | Madden et al. |
| 11,250,637 | B1 | 2/2022 | Tan et al. |

(Continued)

FOREIGN PATENT DOCUMENTS

WO WO 2022-241251 A1 11/2022

OTHER PUBLICATIONS

Digital Twin Demo, PTC, 2020; https://www.youtube.com/watch?v=ERa8sN837hO (Year: 2020).

*Primary Examiner* — Xin Sheng

(74) *Attorney, Agent, or Firm* — Manatt, Phelps & Phillips, LLP

(57) ABSTRACT

A system and method for 3D anomaly detection and tracking are provided that uses multimodal fusion, reduced training data, recursive segmentation and histogram statistic distance. The anomaly may be a defect or a configuration error.

16 Claims, 19 Drawing Sheets

(56) References Cited

U.S. PATENT DOCUMENTS 11,562,180 B2 * 1/2023 Nushi .................. G06N 20/20
12,125,146 B1 10/2024 Tan et al.
12,387,435 B2 8/2025 Tan et al.
2003/0065817 A1 4/2003 Benchetrit
2005/0027870 A1 2/2005 Trebes, Jr.
2005/0047427 A1 3/2005 Kashima
2006/0050697 A1 3/2006 Li
2006/0080454 A1 4/2006 Li
2006/0098662 A1 5/2006 Gupta
2006/0159079 A1 7/2006 Sachs
2007/0130585 A1 6/2007 Perret
2007/0140171 A1 6/2007 Balasubramanian
2007/0245010 A1 10/2007 Arn et al.
2007/0247457 A1 10/2007 Gustafsson
2007/0273610 A1 11/2007 Baillot
2008/0162670 A1 7/2008 Chapweske
2009/0041120 A1 2/2009 Yu
2009/0046140 A1 2/2009 Lashmet
2009/0182815 A1 7/2009 Czechowski, III
2009/0196338 A1 8/2009 Ali
2009/0248872 A1 10/2009 Luzzatti
2009/0254659 A1 10/2009 Li et al.
2010/0225743 A1 9/2010 Florencio
2010/0253700 A1 10/2010 Bergeron
2011/0084983 A1 4/2011 Demaine
2011/0158311 A1 6/2011 Abadir
2012/0038739 A1 2/2012 Welch
2012/0106921 A1 5/2012 Sasaki
2013/0117377 A1 5/2013 Miller
2013/0286004 A1 10/2013 McCulloch
2016/0203646 A1 7/2016 Nadler
2017/0150122 A1 5/2017 Cole
2018/0157398 A1 6/2018 Kaetler
2019/0052883 A1 2/2019 Ikeda
2020/0281539 A1 9/2020 Hoernig
2020/0372709 A1 11/2020 Ponjou Tasse
2021/0110197 A1 * 4/2021 Zamora ............... G06N 3/0442
2021/0133850 A1 5/2021 Ayush
2022/0027529 A1 1/2022 Zarur
2022/0028061 A1 * 1/2022 Fogelson .............. G06V 10/50
2023/0021676 A1 1/2023 Sreejith
2023/0115887 A1 4/2023 Tan et al.

* cited by examiner

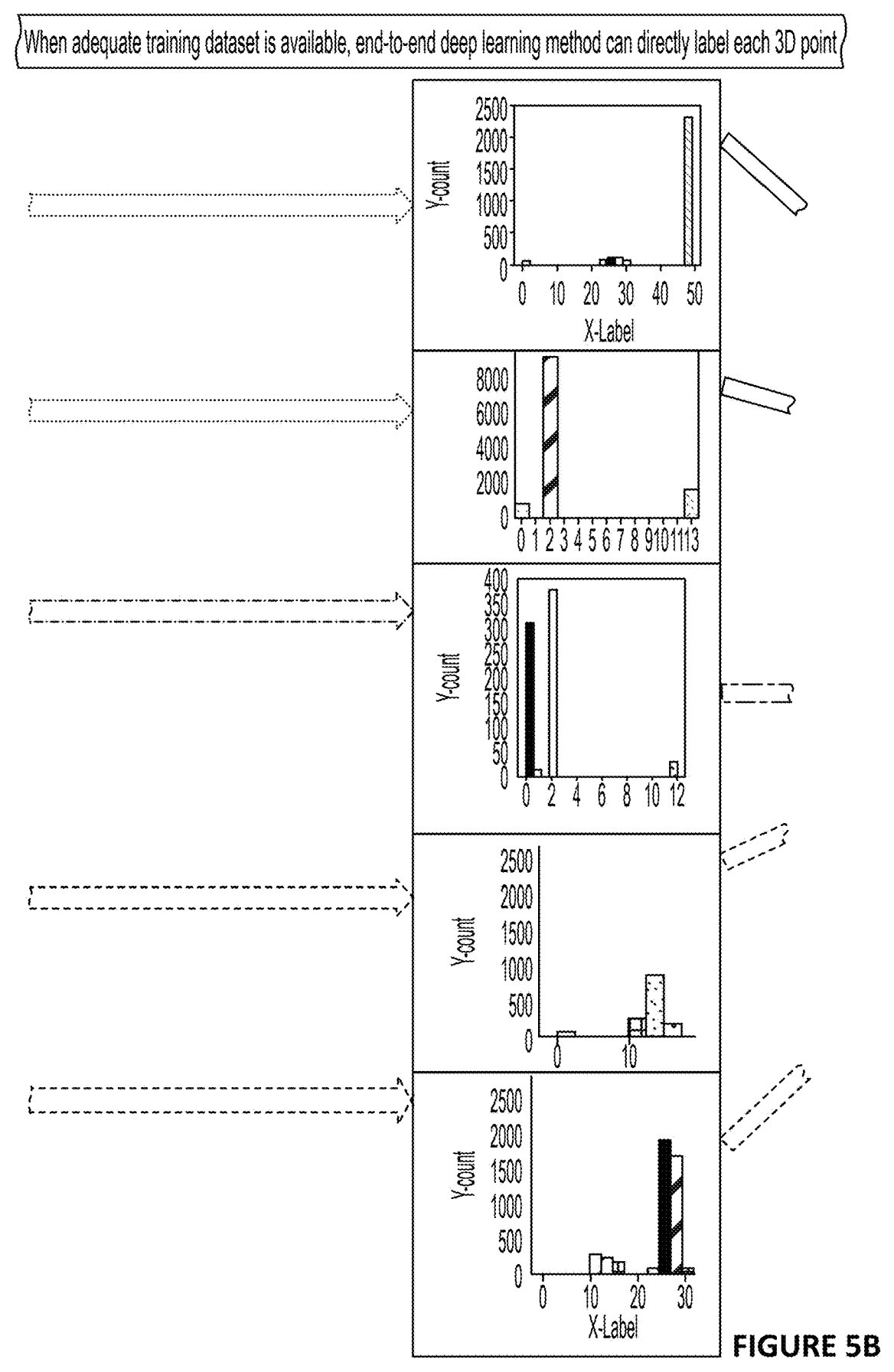

When adequate training dataset is available, end-to-end deep learning method can directly label each 3D point Y-count
2500
2000
1500
1000
500
0
0 10 20 30 40 50
X-Label 8000
6000
4000
2000
0
0 1 2 3 4 5 6 7 8 9 10 11 13

Y-count
400
350
300
250
200
150
100
50
0
0 2 4 6 8 10 12

Y-count
2500
2000
1500
1000
500
0
0 10

Y-count
2500
2000
1500
1000
500
0
0 10 20 30
X-Label

FIGURE 5B

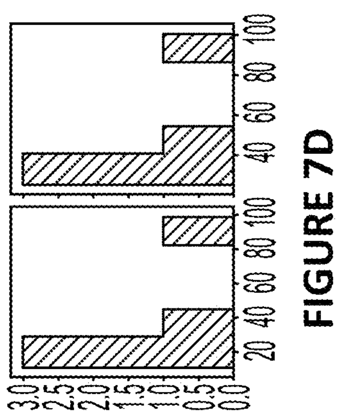
FIGURE 7D
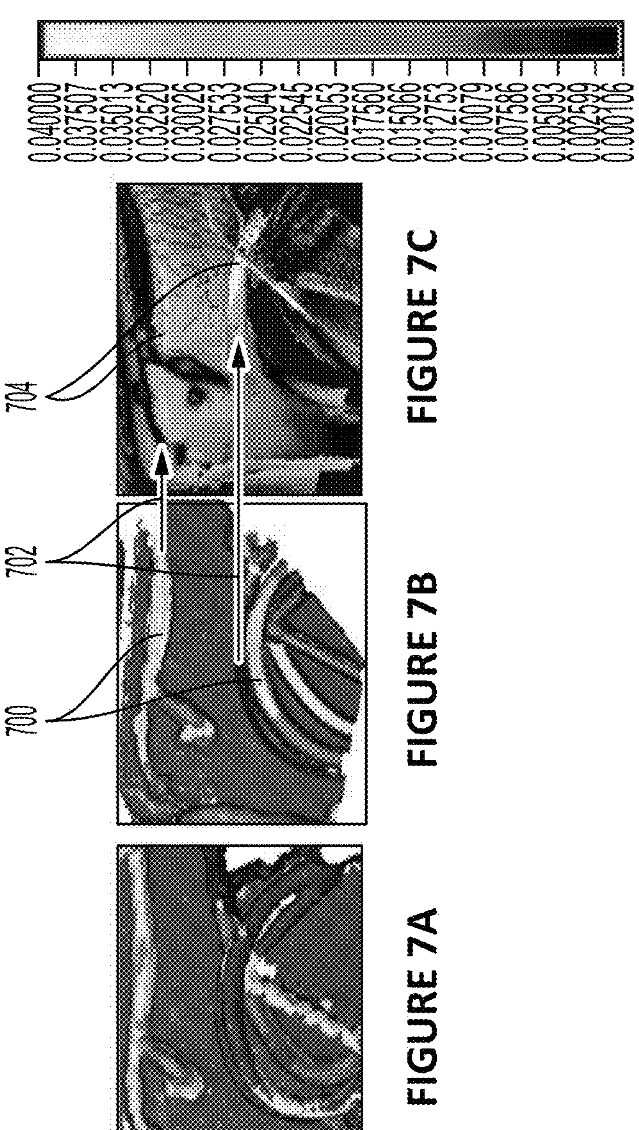
FIGURE 7A
FIGURE 7B
FIGURE 7C

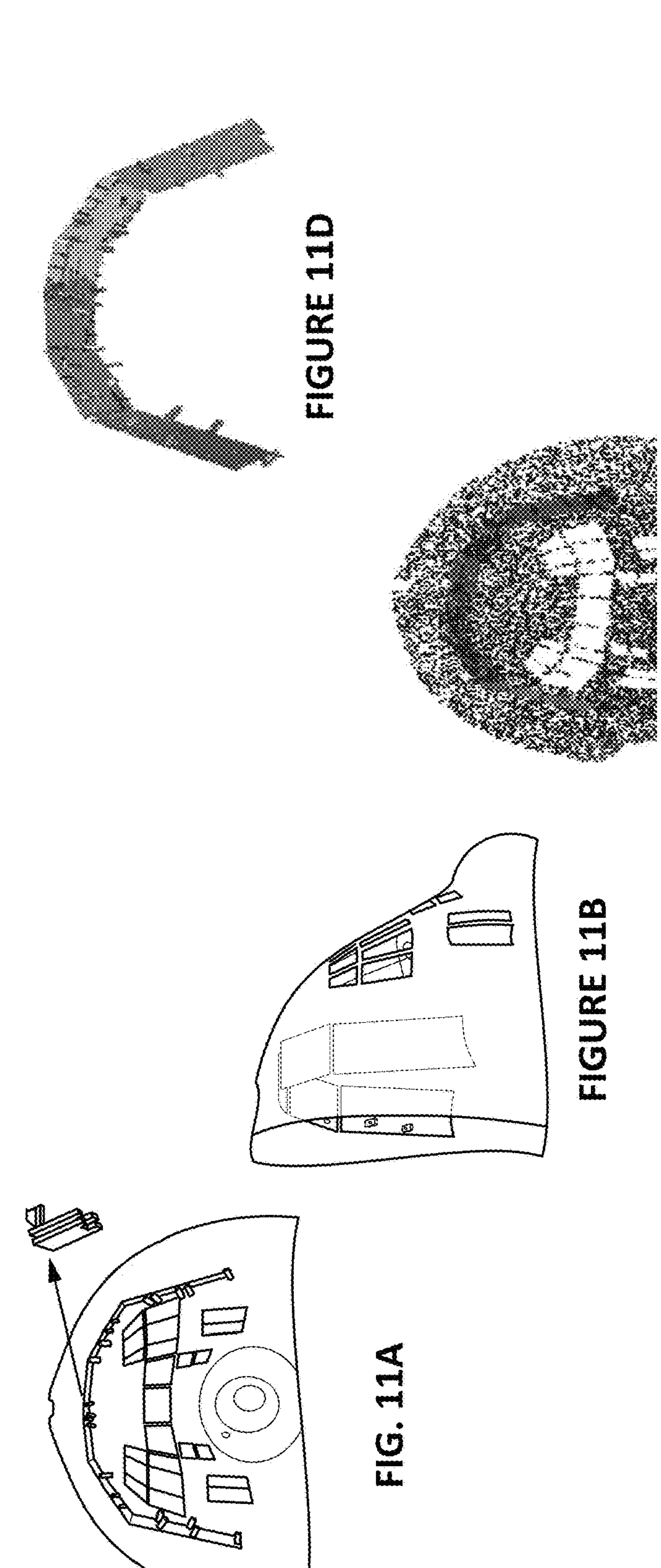
FIG. 11A
FIGURE 11B
FIGURE 11C
FIGURE 11D
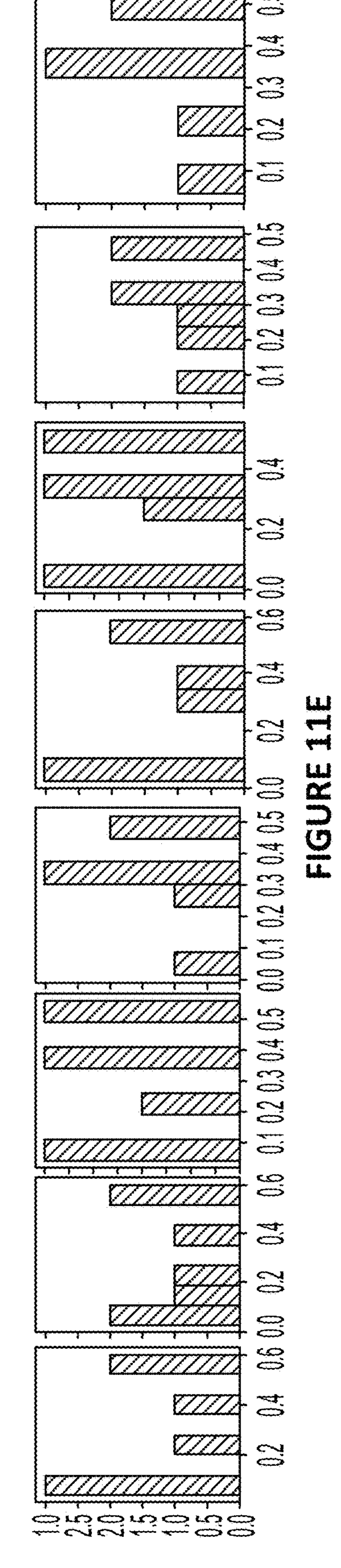
FIGURE 11E

| Similarity Delta between Removal # of bracket pairs (left - right) | Our Segmentation Mean | Our Segmentation STD | OpenVINO Models Mean | OpenVINO Models STD |
|---|---|---|---|---|
| (5, 3) | -0.0024 | 0.0020 | -0.00027 | 0.0008 |
| (7, 5) | -0.0041 | 0.0020 | -0.00036 | 0.0007 |
| (9, 7) | -0.0014 | 0.0025 | -0.00029 | 0.0006 |
| (11,9) | -0.0020 | 0.0031 | -0.00009 | 0.0008 |
| (13,11) | -0.0063 | 0.0028 | -0.00062 | 0.0005 |
| (15,13) | -0.0040 | 0.0006 | -0.00029 | 0.0009 |
| (17,15) | -0.0034 | 0.0010 | -0.00127 | 0.0003 |

$$W_p(\mu, \nu) = \inf_{\gamma \in \Gamma(\mu,\nu)} \left( \mathbf{E}_{(x,y)\sim\gamma}\, d(x,y)^p \right)^{1/p}$$

FIGURE 15

ANOMALY TRACKING SYSTEM AND METHOD USING ENTERPRISE DIGITAL TWINS BASED MIXED REALITY

RELATED APPLICATIONS

This application is a continuation in part of and claims priority under 35 USC 120 to U.S. application Ser. No. 17/711,695, filed Apr. 1, 2022 and entitled "DIGITAL TWIN SUB-MILLIMETER ALIGNMENT USING MULTI-MODAL 3D DEEP LEARNING FUSION SYSTEM AND METHOD" that is in turn is a continuation in part and claims priority under 35 USC 120 to U.S. application Ser. No. 17/575,091, filed Jan. 13, 2022 and entitled "MULTI-MODAL 3D DEEP LEARNING FUSION SYSTEM AND METHOD FOR REDUCING THE NEED OF 3D TRAINING DATASET OF 3D OBJECT TRACKING FOR ENTERPRISE DIGITAL TWIN MIXED REALITY" that is in turn a continuation and claims priority under 35 USC 120 to U.S. application Ser. No. 17/320,968, filed May 14, 2021 and entitled "MULTIMODAL 3D DEEP LEARNING FUSION SYSTEM AND METHOD FOR REDUCING THE NEED OF 3D TRAINING DATASET OF 3D OBJECT TRACKING FOR ENTERPRISE DIGITAL TWIN MIXED REALITY" (now issued as U.S. Pat. No. 11,250,637 on Feb. 15, 2022, all of which are incorporated herein by reference.

FIELD

The disclosure relates generally to a mixed reality system and method for anomaly tracking and in particular to a portable 3D manufacturing defect tracking system and method that uses enterprise digital twins based mixed reality.

BACKGROUND

Human visual inspection is still the most widely used method for large area surface inspections in manufacturing and maintenance operations, such as aircrafts, rockets, construction/manufacture sites, etc. Mobile drone, wearable mobile AR glass and robot assisted inspection has also emerged in recent years. Designing reliable portable mobile inspection system and flexible robotics systems are challenging, facing difficulties such as inadequate coverage of inspection area of a certain view angle, false positive defects identification of pure 2D video based mobile wearable augmented reality (AR) inspection system, requiring reconfigurable robotics path to be found in cluttered repair plants, and low resolution from noncontact or far sight distant camera-based drone inspection system.

Deep learning-based methods are attracting more and more interest at micro-scale, meso-scale, and macro-scale level although these methods are primarily 2D defect detection and are usually compromised by the lack of quality and quantity of relevant data that can truly represent the industry non-generic defects.

It would be desirable to provide a technical solution that provides a practical robust procedure for three dimensional (3D) defect inspection based on the matching feature profile of the digital twins to their real-world counterparts.

BRIEF DESCRIPTION OF THE DRAWINGS

FIGS. 5A-5C illustrates an example of a 3D object tracking with reduced training data with multimodal fusion;

FIGS. 7A-7D are results of defect detection for a big sized subject;

FIG. 11A-11G are a quantitative study of configuration of variation in number of brackets;

FIG. 15 illustrates a statistical distance measure that may be used to generate the results shown in FIGS. 11A-11F above;

DETAILED DESCRIPTION OF ONE OR MORE EMBODIMENTS

Figure 1:
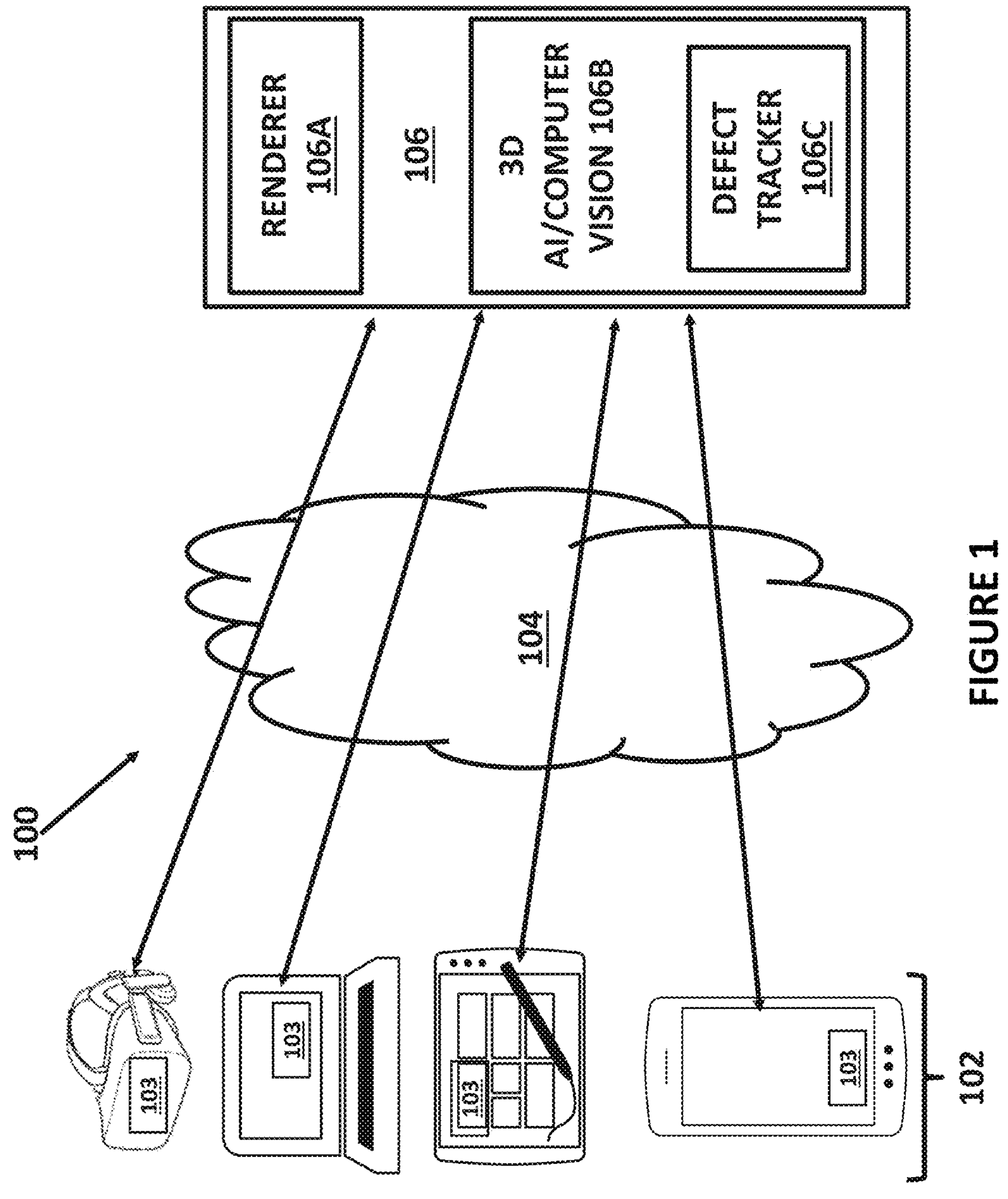
FIG. 1 is a mixed reality system that includes defect tracking using reduced training data and one or more machine learning models.

The disclosure is particularly applicable to a mixed reality system with defect tracking with enterprise digital twins based mixed reality for manufacturing of hardware and it is in this context that the disclosure will be described. It will be appreciated, however, that the defect tracking system and method has greater utility since it can be used with any manufacturing process or manufactured element or a non-manufacturing purpose and may be used separately for anomaly tracking without being associated with a manufacturing process. For purposes of the disclosure, an anomaly can be a manufacturing or non-manufacturing defect, a material defect or a configuration error like shown and described below with the brackets.

A time of flight (TOF) mixed reality (MR) digital twin mobile system supporting three-dimensional (3D) tracking and defect detection using a recursively fused multimodal segmentation paradigm are implemented. In the system, simplified machine learning can be used for clustering multimodal 3D semantic label distribution (output of generic data trained segmentation deep learning model as discussed below) and to reduce the need to obtain high cost and extremely scarce non-generic training data to flexibly customize segmentation for non-generic enterprise defect inspection applications. The fused model first segments with 3D physics properties (reflection, curvature, materials etc.) obtained from TOF and tracks objects with defect from a 3D scene and then further segments recursively on different level of details to detect defects with quantification analysis based on segmentation distribution statistic distance. This method also removes the need to do compute intensive non-real-time algorithms (3D mesh generation, SLAM bundle adjustment and cross source 3D alignment) needed for 3D defect detection. User can do portable free hand acquisition to track and quantify the severity of 3D anomaly defects and categories of 3D configuration without the need to follow strict data capture guidance and 3D point cloud alignment registration as required by other state of the art enterprise MR systems.

The novel system and method provide a practical robust procedure for 3D defect inspection based on the matching feature profile of the digital twins to their real-world counterparts. For productions in large scale, quick and early identification of defects is the crucial step. This MR defect detection system is designed to be practically implemented into a user-friendly enterprise product both for the developers and the end users. The versatile, learning based workflow is robust and adaptable for various industry inspection projects with reduced few-shot of non-generic 3D training data by recursive fusing different segmentation algorithms or deep learning models trained with different related generic 3D benchmark training datasets. The method presented here is majorly focused on detecting the defect entity through an industrial grade mobile wearable MR head mounted device (HMD), such as the Microsoft HoloLens2, with enhanced portable MR and 3D AI features supported by a local server or remote cloud services, as discussed below.

Digital twin-based inspection is considered a key component for quality assurance in industry 4.0. The application is already in many industry fields in a stage of standardization and attracting broad interests. With new generation of MR HMDs with on-device 2D and 3D cameras, digital twin-based RGB/D method can achieve 3D geometric related defect detection that 2D defect inspections cannot, such as: 1) Robustness to different lighting conditions, 2) Categorize defect severity with the depth information in the detected regions, 3) Avoid false positives of 2D defect detection without indication of uncertainty due to color, dusts and stains etc., all of which can be mitigated by additional depth information and geometry consistency of different view angles. The defect detection system uses a multimodal system and process that utilizes multiple machine learning and artificial intelligence systems on visual, spatial and gestural signals, such as a plurality of neural networks wherein each neural network has its own unique topology network structure which inherently exhibits different numerical feature extraction behaviors when learning 3D scene features from a publicly available benchmark 3D training dataset. The distribution of features and scene context learned in a certain pre-trained model can probe certain aspects in the higher dimensional feature space of real-world objects and scene point clouds so that a pre-trained model trained by general benchmark data can be used as a weak classifier for specific applications. Combining inference results of multiple pre-trained models can yield a full spectrum of properties which are defined in the features extracted from generic benchmark datasets by individual pre-trained deep learning models. This uncertainty reduction concept is like sensor fusion in autonomous driving to understand the real driving environment and can also be seen as painting objects and scenes by using multiple colors to maintain high fidelity. Further details of this multimodal system and process are disclosed in U.S. Pat. No. 11,250,637 and US Publication No. 2023-0115887 that are both assigned to the same assignee as the present application and are incorporated herein by reference.

FIG. 1 is a mixed reality system 100 that includes defect tracking using reduced training data and one or more machine learning models. The system 100 may have one or more computing devices 102 that each may store and execute a client application 103 to communicate, via a connection over a communications path 104, to a backend system 106 that together provide the mixed reality experience. Thus, each computing device 102 may be a processor based device that has one or more displays and memory and can generate a mixed reality environment (images or videos) user interface based on data and commands communicated from the backend system 106. As shown in FIG. 1, the computing device 102 may be an AR/VR headset, a laptop, a tablet computer and/or a smartphone device. In some cases, each of the computing devices 102 may be the headset that is particularly suited for generating mixed reality user interfaces. For example, the headset typically has a separate display for each eye so that a different mixed reality stream may be displayed to each eye further promoting the 3D aspect of the mixed reality. Examples of the headset may be the Microsoft® HoloLens and the Oculus® Quest commercial products. In the case of the headset, it may have firmware/code that is executed by the processor of the headset while the other computing devices may have a mixed reality app that is executed by the processor. As shown in FIG. 1, each computing device 102 and the backend 106 may be remote from each other in this embodiment, but it is also possible to have a mixed reality system in which the computing device 102 and the backend 106 are integrated together. One aspect of the system 100 and the backend 106 is that defect tracking occurs. In a typical system, this defect tracking may be performed using a deep learning algorithm for the complex 3D data in which it is necessary to train the deep learning algorithm using a large amount of training data which is a technical problem that limits the utility of these typical systems. The system 100 and in particular the backend 106 may provide a technical solution to this problem by: 1) reducing the complexity of the 3D (millions of 3D points XYZ value to hundreds of values in a multi-dimensional vector) data using two or more machine learning models with benchmark 3D training data that each generate histograms and together generate a reduced set of training data; 2) training a simpler machine learning model using the reduced training data; and 3) using the trained machine learning model to solve the 3D object defect tracking problem.

Figure 2:
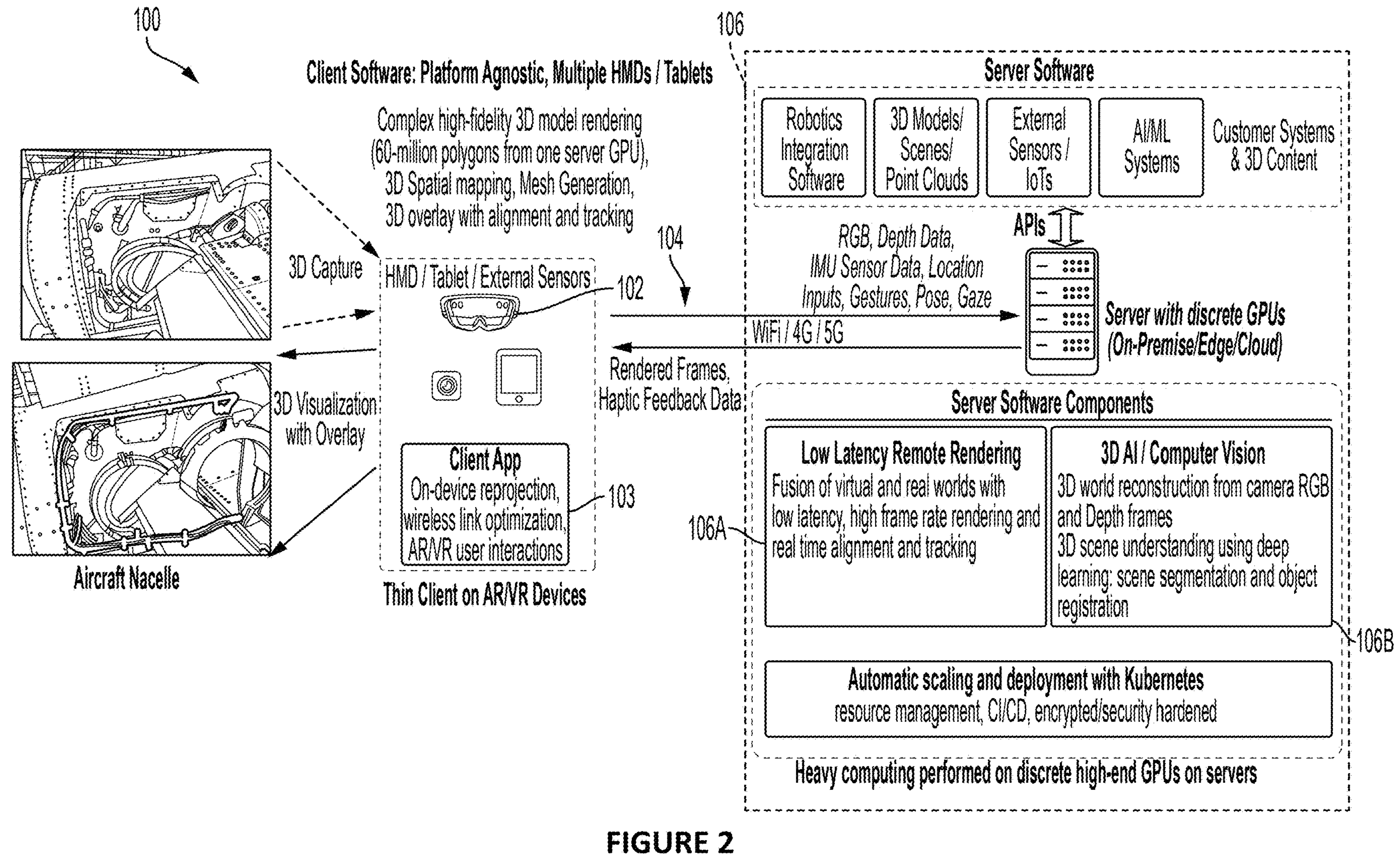
FIG. 2 illustrates an implementation of the mixed reality system in FIG. 1 that has remote rendering and 3D AI/Computer Vision based object detection and alignment to a digital twin for an exemplary wire harness for an aircraft nacelle.

As shown in FIG. 1, the backend 106 may further comprise a renderer element 106A and a three dimensional AI/computer vision element 106B that generates, renders and sends the mixed reality data to each computing device using known data transfer protocols. The three dimensional AI/computer vision element 106B may further comprise an object defect tracking element 106C that performs a technically complicated 3D object defect tracking process for the mixed reality data. The object defect tracking element 106C is improved by the below disclosed multimodal fusion process. In one embodiment, the object defect tracking component 106C includes an inference engine that performs the method shown in FIG. 6 (with examples shown in FIGS. 7A-16D) to improve the object defect tracking and overlay registration of the object and the digital twin. The backend 106 may be implemented as a computer system, such as one or more server computers, blade servers, cloud computing systems, one or more server computer(s) with discrete graphics processing units (GPUs) that may be on-premises of the client or system owner, on an edge of a network or in the cloud as shown in FIG. 2, etc. that have at least one processor, memory and circuits to communicate and exchange data with each computing device 102. Each of the elements 106A-106C may be implemented as a hardware circuit or device or as a plurality of lines of computer code/instructions that are executed by the processor of the backend so that the processor is configure to perform the operations of each of the elements or each of the hardware circuits perform those operations.

FIG. 2 illustrates an implementation of the mixed reality system in FIG. 1 and shows more details of at least one computing device 102, the communication path 104 and the backend 106. Each computing device 102 may include the client application 103 (mobile app, downloaded app and/or app already resident on the computing device 102) that performs functions and operations for on-device reprojection, wireless/wired link optimization and augmented reality (AR)/virtual reality (VR) user interactions. As part of the mixed reality, each computing device 102 performs complex high-fidelity 3D model rendering (such as 60-million polygons from one server GPU), performs 3D spatial mapping, performs mesh generation and performs 3D overlay with alignment and tracking including defect tracking.

During a mixed reality environment session, various data is exchanged over the communication path 104 via WiFi or 4G or 5G. Specifically, RGB-depth data (and XYZ data) of the video/images, inertial measurement unit (IMU) sensor data, inputs, gestures, poses and gazes may be communicated from each computing device 102 to the backend while the backend 106 may communicate rendered frames for the mixed reality and/or haptic feedback data to each computing device 102 wherein the rendered frames are reprojected and customized to each computing device 102 based on the data provided from the computing device 102. For example, in one exemplary embodiment, the computing device may be a wearable edge device.

The backend 106 may use well known application programming interfaces (API) to receive data from various third party systems (customer systems and 3D content) including robotics integration software, 3D models/Scenes/Point Clouds, external sensors/IoTs, and/or AI/ML systems. The renderer 106A, as shown in FIG. 2, may perform low latency remote rendering that fuses virtual and reality worlds with low latency, high frame rate rendering and real time tracking. The 3D AI/computer vision element 106B performs 3D world reconstruction from camera RGB data and depth (XYZ) frames. The 3D AI/computer vision element 106B also performs 3D scene understanding using deep learning scene segmentation and object registration which are also technical processes that are improved by the multimodal fusion as described below. The backend 106 may also include a deployment element shown in FIG. 2 for automatic scaling and deployment with Kubernetes that includes resource management, CI/CD and encrypted/security hardened security.

The system 100 shown in FIGS. 1-2 may be used to generate a mixed reality environment that may include 3D object defect tracking. The precise overlay of a 3D model (known as the digital twin) with an actual object in a scene (see FIG. 4 below for an example) helps in industrial design, assembly, training, and also to catch any errors or defects in manufacturing. The system allows the user to also track the object(s) and enhance the rendering as the work progresses.

Most conventional on-device object tracking systems use a 2D image and/or marker based tracking that severely limits overlay accuracy in 3D because 2D tracking cannot estimate depth with high accuracy and consequently the scale, and the pose. This means with a conventional system, even though the user gets what looks like a good match when looking from one angle and/or position, the overlay loses alignment as you move around in six degrees of freedom (6DOF). Also the 3D object tracking, identification and its scale and orientation estimation—called object registration—is achieved, in most cases, computationally or using simple computer vision methods with standard training libraries (examples: Google MediaPipe, VisionLib). This works well for regular and/or smaller and simpler/generic objects such as hands, faces, cups, tables, chairs, wheels, regular geometry structures, etc. However for large, complex/uniquely designed objects in enterprise use cases, labeled training data (more so in 3D) is not readily available. This makes it difficult, if not impossible, to use the 2D image based tracking to align, overlay, and persistently track the object and fuse the rendered model with it in 3D. These are some of the technical problems with existing/conventional systems. These conventional on-device object tracking would be unable to be used for defect tracking on an object.

The system solves these technical problems by providing a technical solution. For example, for 3D object defect tracking, the system and method may perform a detailed 3D scene understanding following the workflow discussed below. Given the computation limitations of the computing devices 102, such as the HoloLens, the entire 3D processing is done on the backend 106, with discrete high end GPUs, where the color (RGB) and depth (D) data (RGBD) from the camera of the computing device 102 may be used to reconstruct a full 3D point cloud with complete texture mapping. A fine mesh is then generated using this 3D depth map and the relation between different parts of the scene is established. Both the RGB data and the depth data is used to segment the scene as discussed below. This technical solution allows the system and method for perform portable defect tracking on an enterprise system using the computing devices.

Figures 3, 4:
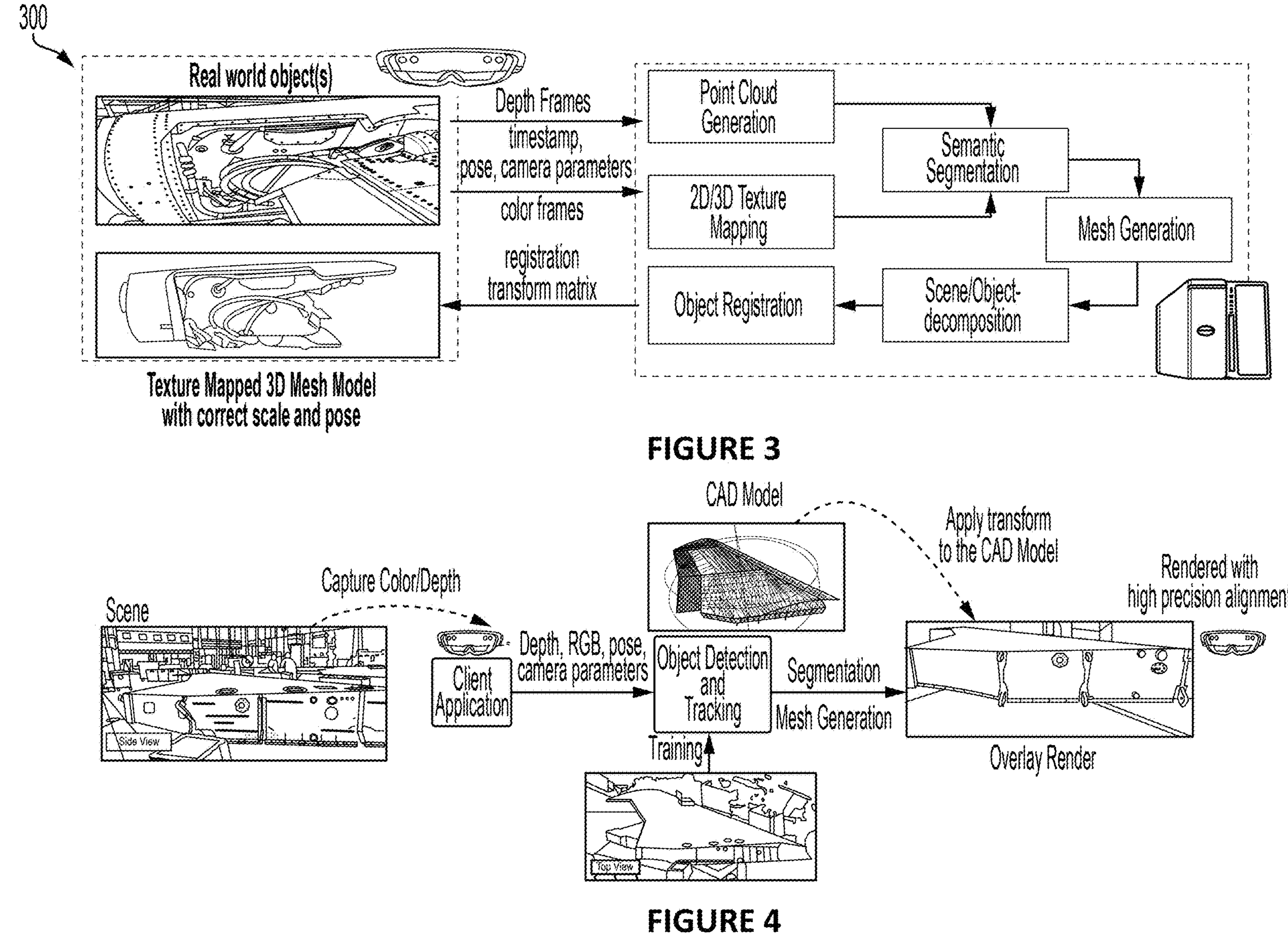
FIG. 3 illustrates an example of the 3D object detection and post estimation using hybrid 2D/3D (RGB/D) data that may used for the defect detection.
FIG. 4 illustrates an example of the 3D object recognition and tracking using the workflow in FIG. 3 that also reduces the reliance of training data.

In the example in FIG. 3, the object of interest is a aircraft nacelle. The system 100 and its elements are able to isolate the engine nacelle from the rest of the scene by identifying its features using our deep learning based inference engine (for example part of the object detector 106C in FIG. 1) that matches the object in the scene to the 3D model/digital-twin. The inference engine then automatically evaluates the object's distance and orientation and generates the 3D transform for the object registration and renders the model precisely overlaying on top of the object. The rendered model can actually track any movement of the person or the object itself, in real time.

FIG. 4 illustrates an example of the 3D object recognition and tracking using the workflow in FIG. 3 that also reduces the reliance of training data in which the system provides real time object tracking while wearing a mobile MR HMD and overlaid rendering in a cluttered manufacture environment among which there is a model of aircraft wing. The deep learning-based recursive segmentation allows the system to identify and track 3D objects of arbitrary shape and size in various orientations with high accuracy in the 3D space. This approach is scalable with any arbitrary shape and is amenable to use in enterprise use cases requiring rendering overlay of complex 3D models and digital twins with their real-world counterparts. This can also be scaled to register with partially completed structures with the complete 3D models, allowing for on-going construction and assembly. The system and method achieve an accuracy (relatively <1% error) of 1~10 mm depending on the object's dimension size during recursive segmentation-based tracking and rendering using the system that illustrates the improvement over conventional systems that cannot achieve that accuracy. This approach to 3D object tracking will allow the system to truly fuse the real and virtual worlds, enabling many applications including but not limited to training with work instructions, defect detection, manufacturing error inspection in construction and assembly and 3D engineering design with life size rendering and overlay.

Figure 5A:
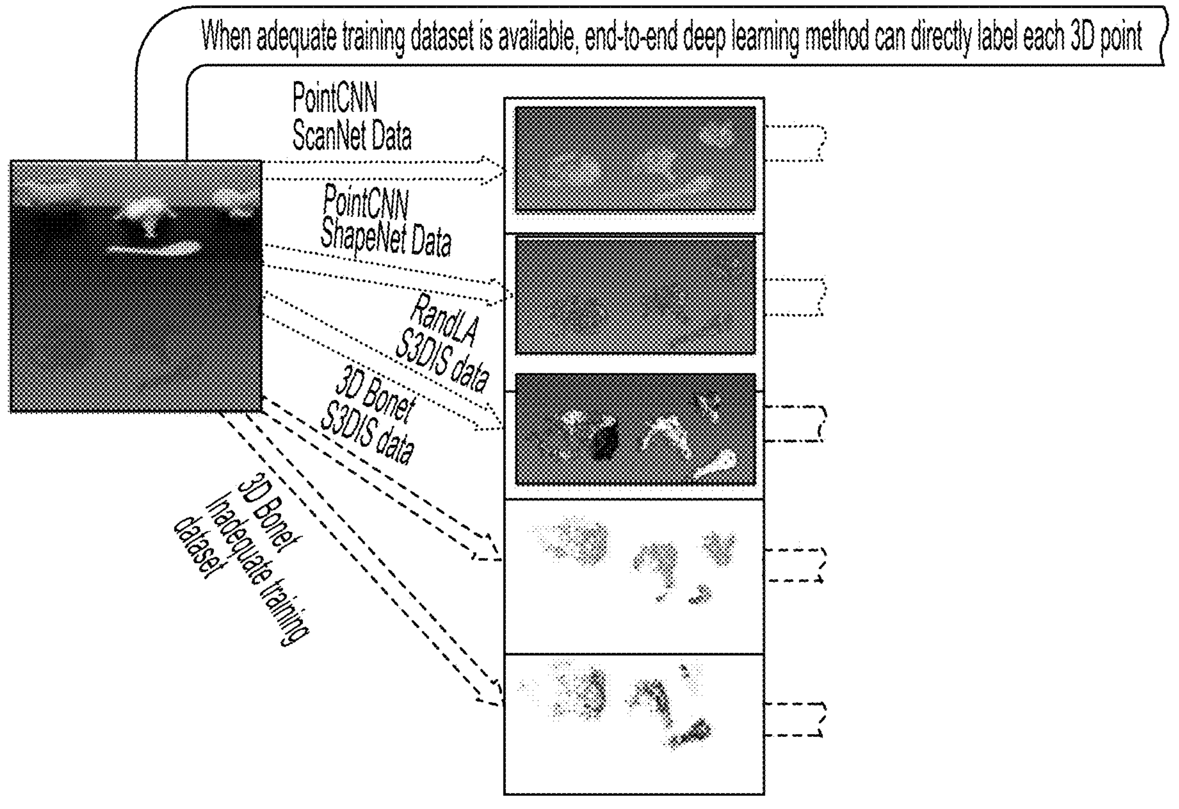
Figure 5C:
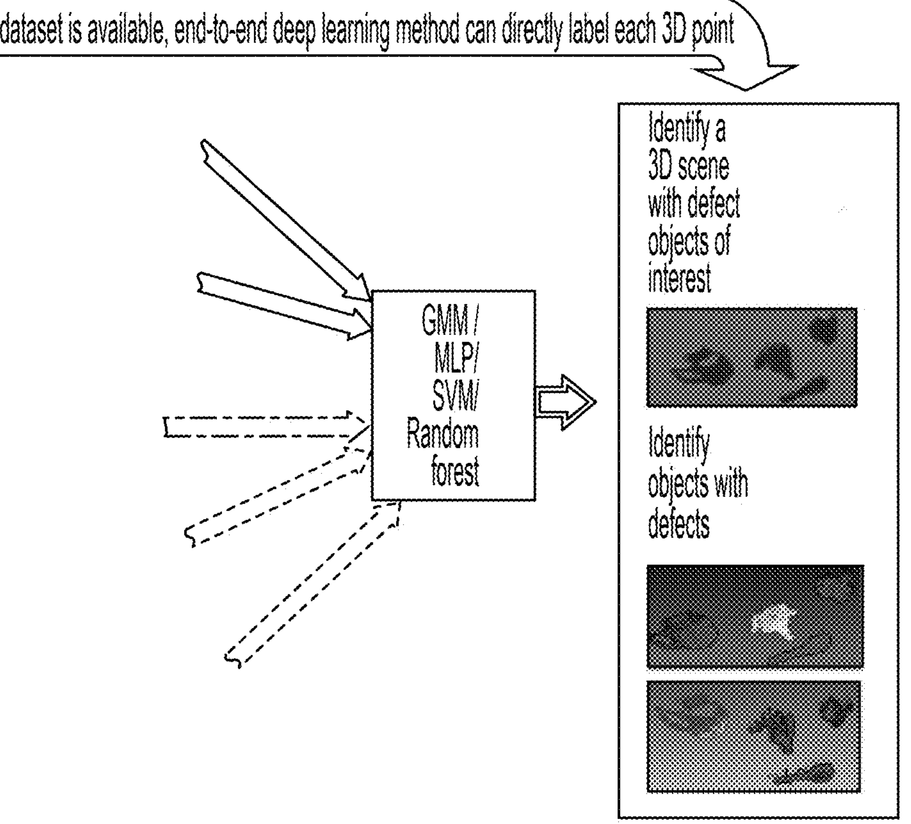

FIGS. 5A-5C illustrates an example of a 3D object tracking 500 with reduced training data with multimodal fusion that may be used as part of the defect detection and tracking system. In particular, for the 3D semantic segmentation, the method (shown in detail in FIGS. 5A-5C) uses multiple deep neural network structures (such as PointCNN, 3D Bonet, RandLA, etc. in one fused system) trained by different benchmark generic 3D datasets (ScanNet, ShapeNet, S3DIS, inadequate few-shot nongeneric enterprise training datasets, etc.) to perform 3D semantic segmentation of 3D scenes not seen by the fused recursive segmentation workflow. For each cluster of a point cloud, each pre-trained model will label 3D objects in different distributions (histogram of object labels existing in generic 3D benchmark datasets, sharing some geometric similarity with different objects in the current non generic 3D scene). The labeled distribution can be used as the fingerprint of the 3D point clustering so that object/scene can be understood. Combining using different approaches, such as Gaussian mixture modeling (GMM), multilayer perceptron (MLP), support vector machine (SVM), random forest, k-nearest neighbors (KNN), distribution distance-based clustering etc., these specific distributions of multiple pre-trained models are merged into a stronger classifier. The major advantage of this approach is to minimize the non-generic labeled training data requirement for a specific enterprise use case whose dataset usually is not public available in generic 3D bench mark datasets and improve the generalizability of combined deep neural networks.

Figure 6:
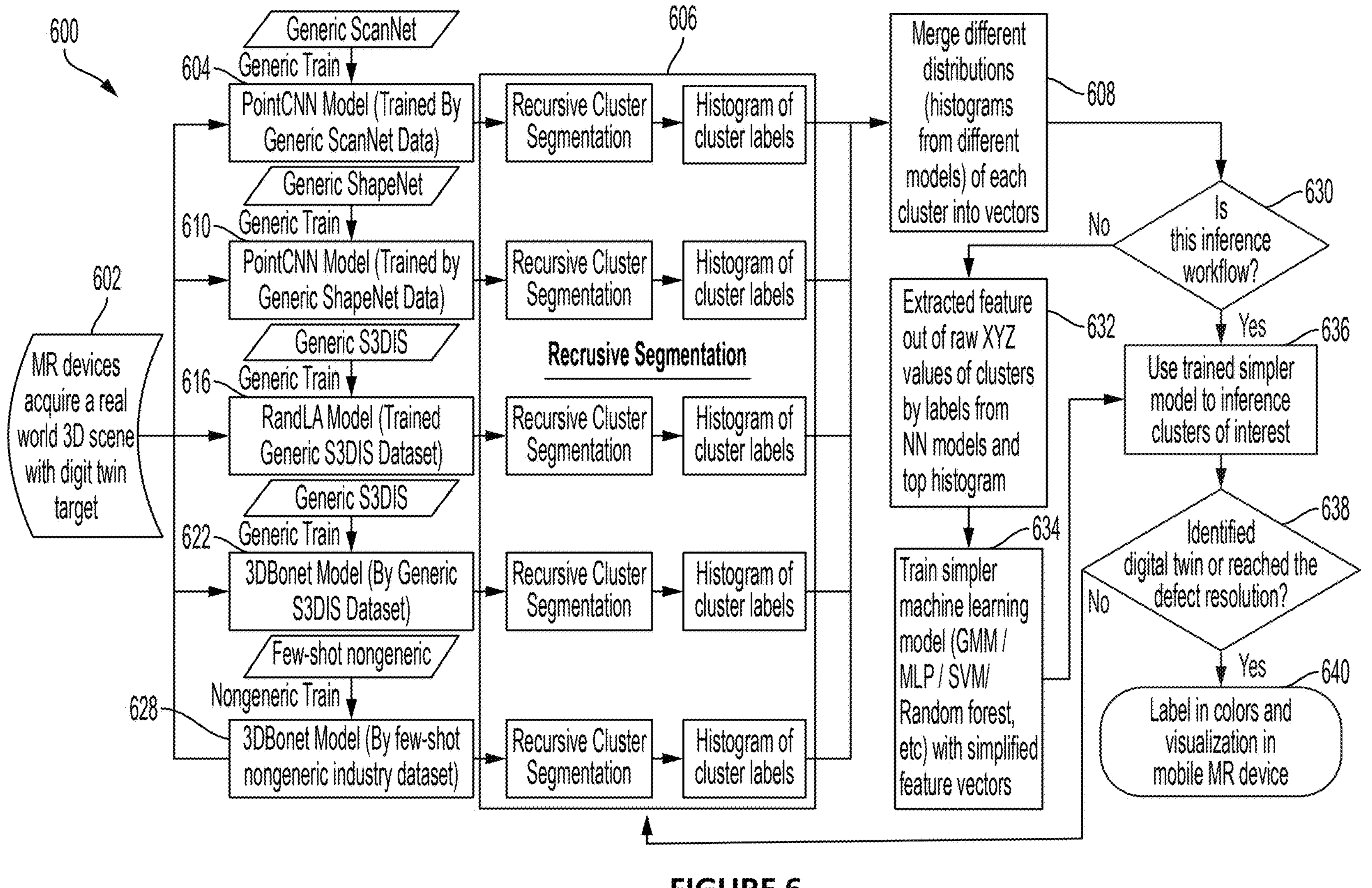
FIG. 6 illustrates a method for 3D object/anomaly tracking (defect tracking)

FIG. 6 illustrates a method for 3D object/anomaly tracking (defect tracking) with the reduced training data. The method 600 may be performed by the defect detector and tracker 106C in FIG. 1 and the mixed reality system described above may also be implemented using other systems in which it is desirable to improve image processing and 3D object tracking as part of a larger system and method. In one embodiment, the processes of the method 600 shown in FIG. 6 each may be implemented as a plurality of instructions/code that are executed by a processor of a computer system of the backend 106 wherein the instructions/code configure the processor or cause the processor to perform the below described processes.

In one example use case, the method is being used to detect a defect on an object in a scene represented by a point cloud (industrial design, manufacturing, medical, etc. in which it is desirable to have submillimeter accuracy) and a digital twin target as described above and the method may receive a 3D point cloud dataset of a real world 3D scene and digital twin target data (602), with examples of that data shown and described below. This data may be collectively called "input data" in the description below. The input data may be input to a plurality of machine learning process 604, 610, 616, 622, 628 (multimodal fusion). Each machine learning process may be pre-trained with data so that each machine learning process is pre-trained and thus does not require the normal training process. For example, a deep learning model (such as a known PointCNN model) (604) may be pre-trained with an adequate benchmark generic dataset (such as a known ScanNet Data). The pre-trained machine learning process 504 may then predict labels of each 3D point of the current 3D scene using the trained model. The method may then use the predicted labels from the training model to perform a whole scene recursive segmentation into multiple clusters (606) in which only points labeled with high confidence are selected since low confidence points are highly likely to be noise or distortion. The correspondence between real world 3D point cloud and digital twin CAD model (a point cloud model can be generated from the digital CAD model) is the most critical factor that directly impact the accuracy. A point labeled as high confidence is a point that is more likely to be paired/match a point in the point cloud generated from the digital twin CAD target in virtual world while the low confidence point is more likely to be a point from the background clutter, random background points, noise or distortion (e.g., not in good alignment) and thus not likely paired/match with a point in the point cloud of the digital twin target in virtual world. The definition of high confidence (and thus low confidence) depends on a particular application and how much features the DNN (deep neural network) model can extract from a current point cloud. For example, a default may be that a top 20% best confidence score points of certain category may be a high confident region (DNN model predict each 3D point as a category class with a confidence score 0-1.0 which defines algorithm's confidence level to classify the 3D point to the certain pretrained category). If the top 20% does not yield best results either because too many points with noise or distortion or too few points to achieve signal/noise ratio (S/N)>1 (# of good quality point/># of noise/distortion point), the definition of high confidence may be adjusted to top 10% or top 30% as high confidence points, respectively.

A second machine learning process (such as the same known PointCNN model) (610) may be trained with data (such as a known S3DIS dataset). The pre-trained machine learning process 610 (pre-trained with a different data set) may then predict labels (high confidence and low confidence of point on object) of each point using the trained model. The method may then perform the whole scene segmentation into multiple clusters (606) in which only points labeled with high confidence are selected since low confidence points are highly likely to be noise or distortion as discussed above. Unlike the first ML process, this prediction process 610 is done using the same ML model (PointCNN) but with a different training data set (ShapeNet benchmark data). For a deep learning model (like PointCNN or the other models shown in FIG. 6, if different training dataset (different set of 3D point cloud and the label of all 3D point in point cloud) are used to train a deep neural network (DNN) model, it results in different weights inside each node of neural network thus changing the inference behavior of the model (literally different training data create different flavor/behavior of same neural network). For example, different training data can guide the DNN model to emphasize extracting different aspect/information of 3D point cloud so that the differently trained DNNs become sensitive to cover multiple aspects (color, geometry curvature, structure semantic relationship, XYZ spatial density) of objects. This is the multimodal fusion aspect of this process.

Returning to FIG. 6, a third machine learning process (such as the known RandLA model) (616) may be trained with data (such as a known S3DIS dataset). The pre-trained machine learning process 616 (pre-trained with a different data set) may then predict labels of each point using the trained model like the other models. The method may then perform a whole scene segment to multiple clusters (606) as above to generate and select high confidence point clusters.

A fourth and fifth machine learning process (such as the known 3D Bonet model for both processes) (622, 628) may be trained with data (such as a known S3DIS dataset and an inadequate data set, such as inadequate data of the digital twin target). An inadequate dataset has data whose complexity is less complicated than the model's complexity. The deep learning model only needs to use part of its neural nodes to predict (more like memorize) the correct label for all training dataset. In this case, deep learning model only need to do a memory/projection to finish training. This unsuccessful training is called overfitting or memorizing mapping, and even the deep learning model can get 100% accuracy in training data, for any unseen real world datasets, the accuracy will be much worse and not meet product quality, so the deep learning model will be practically useless. Each of these pre-trained machine learning processes 622, 628 (each pre-trained with a different data set) may then predict labels of each point using the pre-trained model. The method may then perform the whole scene segment to multiple clusters with selected high confidence points as discussed above (606) for each model. Although FIG. 6 shows three learning models being trained by four different training data sets to get best results, the method may be performed with fewer or more learning models and training data sets for certain use cases. The minimum requirement of multimodal fusion (>=2 models) described here is two models and one 3D benchmark training data. The minimum requirement is for simple 3D digital twin use cases which are majorly composed of geometric primitives and precision/accuracy requirements are low.

The recursive segmentation 606 may receive each of the one or more labels from the one or more models and perform recursive cluster segmentation and generate a histogram of cluster label for each set of pieces of data from each model. The segmentation is recursive since the method has a feedback loop when the identified digital twin or defect resolution is not reached as shown in FIG. 6. The result is a plurality of label predictions from the recursive segmentation 606.

The method 600 may then merge (608) the label predictions for all of the pretrained models of the clusters into a tensor or vector. For each cluster, the method thus has a different prediction distribution for each model and, as discussed above, each is sensitive to a different feature of the 3D data (color, geometry curvature, graph connection structure, semantic relationship, XYZ spatial density, normal vector estimation, etc.). With diverse feature information collected by different models, the system has a much better holistic understanding of target object which enhances the confidence of the label prediction generated by trained DNN model and also abstracts real world objects into a simplified representation with much reduced dimensions and complexity. Therefore, this reduced representation makes it possible to use simpler machine learning model to identify corresponding region between real world and digital twin world with much less non generic training datasets.

The defect detection and tracking method 600 may then take advantage of the multimodal fusion of the pre-trained ML models and the clusters of points from the different models and datasets to perform the defect detection and tracking. The defect detection and tracking method 600 may merge (608) the different distributions (histograms from each of the different models 604,610, 616, 622 and 628 of each cluster into vectors. The method may then determine if an inference workflow (630) may be performed if a trained simpler model is available for inference for clusters of interest. If there is not a trained simpler model available, then the method may extract (632) features out of the raw XYZ values of the clusters by labels from NN models 604, 610, 616, 622 and 628 and top histograms as a set of training data for a simpler machine learning (ML) model. The method may then train (634) the simpler ML model, that may be implemented using a Gaussian mixture model (GMM), multilayer perceptron (MLP), support vector machine (SVM), random forest, etc. algorithms) with simplified feature vectors. The simpler ML model may then be used (636) to inference clusters of interest. The results of the simpler ML model may be analyzed to determine if the digital twin of the defect was identified or the defect resolution was reached (638). In the method that uses the 3D data for the 3D scene, there is data about any defect and the dimensions of the defect (including the resolution) are known. For example, if the defect has a resolution of 1 inch that is known, the method may not perform detection at less than the one inch resolution. Thus, the known resolution of the defect may be used in the method. Similarly, if a digital twin of the defect is identified, then the defect detection is completed.

If the digital twin of the defect was identified or the defect resolution was not reached, then the output from the simpler ML model is fed back into the recursive segmentation 606 as shown which then filters back through the process in FIG. 6. For example, if the defect resolution has not been met, the segmentation is redone at a finer resolution until the known resolution of the defect is exceeded. If the digital twin of the defect was identified or the defect resolution was reached, then the method labels the defect in color and displays a visualization (640) in the device 102, such as a mobile MR device. The method may calculate and use the similarity score of greater than 90% similarity between the detected defect and the data to perform the labeling.

Results

After using methods described above to track the defect region or objects, the system and method can further analyze the region under different sizes of defected objects by applying a fused model recursively to reach different level of detail. As different scans have different output points from different portions of defect region due to scan conditions like scanner configuration, distance, and view angle, etc., the system and method may normalize the biggest segmented region in terms of numbers of points, the histogram of segments represents relative size in point numbers with respect to the region with biggest points, to make different batches of scan comparable to each other. In addition, as histogram distribution of different segmented surface area of different parts of objects is not sensitive to the orientation and arrangement of the components, the defect detection is relatively robust to various view angles, moving components (cables or fixed region), and arrangement.

Due to the point geometry changes caused by defects, the distribution of segments with defects will be different in distribution from segments without defects. For example, the defects caused by bending and impact will cause original one segment to become multiple segments with high curvature crack/defect as boundary; defects due to wearing off will blur the boundary and merge multiple components into one bigger segment; once we select detected defect regions, by applying recursively into different scales of regions of interest, defects in different level of detail and resolution can be revealed according to the requirements of use cases. Based on histogram's statistical distance with/without defect, semi quantification of severity of defect can be provided. The histogram with the defect is generated from the real world data from the computing device 102, such as the Hololens 2 (HL2) wearable device. The histogram without a defect can come from: 1) a real world HL2 scan to get point cloud on a normal object; or 2) normal object point cloud from a CAD model virtual scan (using a virtual HL2 camera to scan/sample surface points of a digit CAD model.

Defect Detection without Alignment

FIGS. 7A-7D are results from a 3D segmentation of region of interest and show a typical defect detection case of a big sized subject where FIG. 7A shows the 3D segmentation of the region of interest without defects, FIG. 7B shows the 3D segmentation of components (with defect regions 700 segmented in orange color and with arrows 702 pointing to that region in FIG. 7C that shows the mesh 3D geometry Hausdorff distance with blue indicates normal region, a region 704 colored red that indicates bigger difference/defect, which corresponds to a segmentation difference between (a) and (b). FIG. 7D shows the histogram of segmentation of corresponding scan (x axis is the segmentation size measured by number of 3D points normalized to biggest segmented region as 1 or 100, y axis is the number of segmentations within a range of x labeled size). For big size subjects as in FIGS. 7A-7D, point clouds in FIGS. 7A and 7B are viewed from different angles. The results show the robustness of our method to detect defects in various view angles without alignment. As the defect region is only a small portion of the whole region, the overall shape of histograms is similar, while noticeable difference can be observed between the segmentation size of each segment and the gap between the biggest segment and second biggest segment. The histogram similarity is computed as (1-distance) between the two probabilities or frequency distributions with two methods (Hellinger: 1−0.14=0.86, Wasserstein: 1−0.22=0.78). In both the cases, the similarity is lower than a preset defect threshold of 0.9, which is further confirmed by an aligned mesh difference map: two red regions (potentially defect regions).

The similarity score may be a statistical distance calculated between histogram (FIG. 7D left side) of normal region (FIG. 7A) and histogram (7D right side) of real world defect acquisition from the HL2 (FIG. 7B). The histogram (left and right side) are the outcome of the workflow shown in FIG. 6) for without defects (FIG. 7A) point cloud scan and with defect (FIG. 7B) point cloud scan respectively. The similarity score can be used for both qualitative (identify/tracking an anomaly/defect) and quantification on the severity of the anomaly (defect and configuration error).

An example of how to determine the Wasserstein distance is shown in FIG. 15. In particular, FIG. 15 illustrates a formula to calculate the Wasserstein distance, $W_p(\mu,\upsilon)$ such as for the example in FIGS. 11A-11G and 14. d=1−wasserstein_distance (h1, hRef), h=histogram of target (remove certain number of brackets and hRef is histogram of reference (without removing any brackets).

Figures 8A, 8B, 8C, 8D:
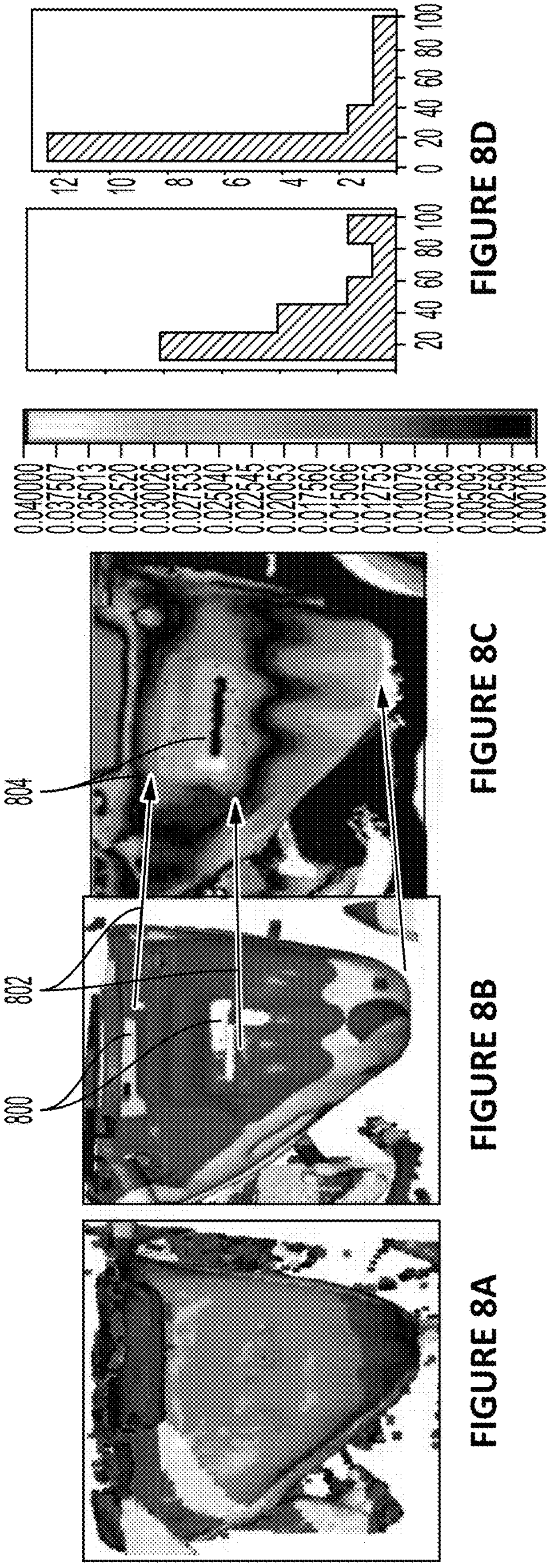
FIGS. 8A-8D are results of a defect detection case of small size subject.

FIGS. 8A-8D are a typical defect detection case of small size subject. FIG. 8A shows a 3D segmentation of components around an engine (without defect) and FIG. 8B illustrates a 3D segmentation of components around an engine (with defects 800) with arrows 802 to FIG. 8C that is a mesh Hausdorff distance comparison result. FIG. 8D shows one or more histograms of segmentation of corresponding scan: left side calculated from FIG. 8A and right-side plot calculated from FIG. 8B.

For the small size subjects as in FIGS. 8A-8D, the major component of point clouds in FIGS. 8A and 8B can be viewed completely even from different angles but there are some surrounding components to add quite some more small segments. The results show the robustness of our method to detect defects without alignment in this case. As the defect region occupies more percentage of region, the histogram shape also becomes different from each other with noticeable difference in all sizes of segments. The histogram similarity is computed (Hellinger: 1−0.16=0.84, Wasserstein: 1−0.15=0.85). In both the cases, the similarity is lower than a preset defect threshold of 0.9 and is reported as a defect, which is again verified by difference map of aligned paired mesh: three regions (potentially defect regions) within the component of interest. The right corner red segment outside region of interest components is due to adjacent parts being movable with relative position changes during the two scans. (won't affect the histogram of region of interest selected by recursive segmentation).

3D Configure Detection

In the airplane industry the cabin interior design is configured differently for different airlines. For mobile AR devices to be applicable during interior assembly, design and training applications, airline configuration needs to be correctly identified. Take the mounting brackets as an example—the novel method disclosed can quickly differentiate both the differences in the number of brackets and their location configuration inside an airplane cabin.

Different Number of Brackets

Figure 9B:
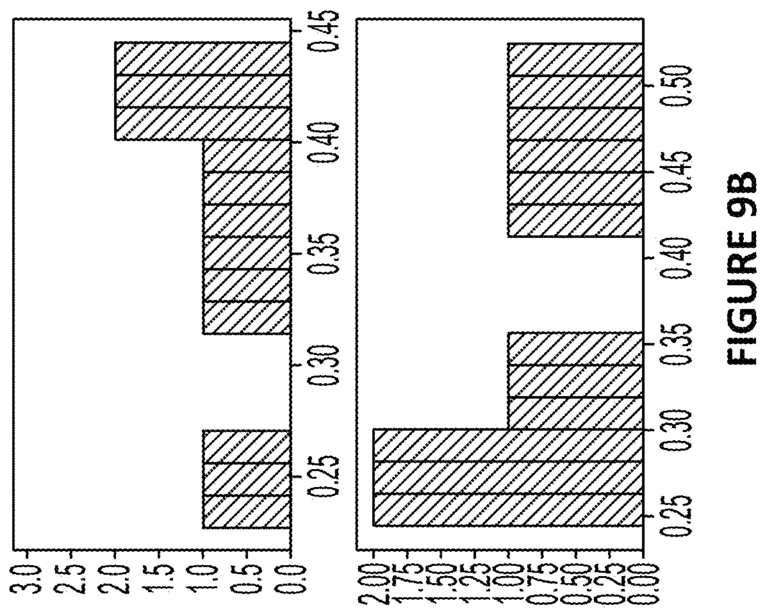
FIGS. 9A and 9B illustrate a different number of brackets being detected and the corresponding histograms.
Figure 9A:
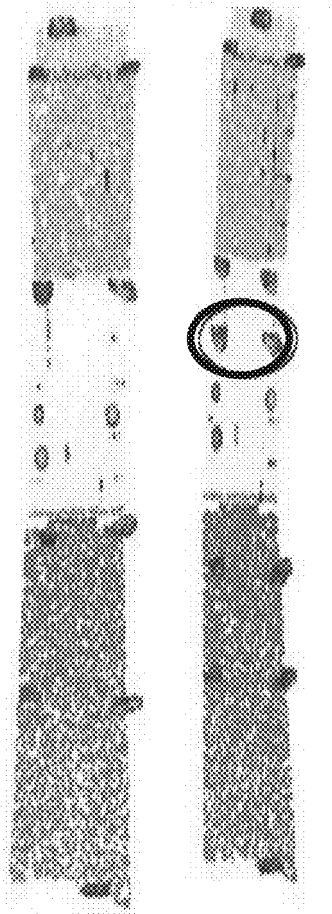

FIGS. 9A and 9B illustrate a different number of brackets being detected and the corresponding histograms. An upper portion of FIG. 9A is a base line bracket configuration while the lower portion of FIG. 9A shows a piece of two additional brackets which are circled wherein a middle region of the part has the different number of brackets. FIG. 9B shows the corresponding histograms for each of the base line bracket and the piece of two additional brackets.

Same Number of Brackets but at Different Locations

Figures 10A, 10B:
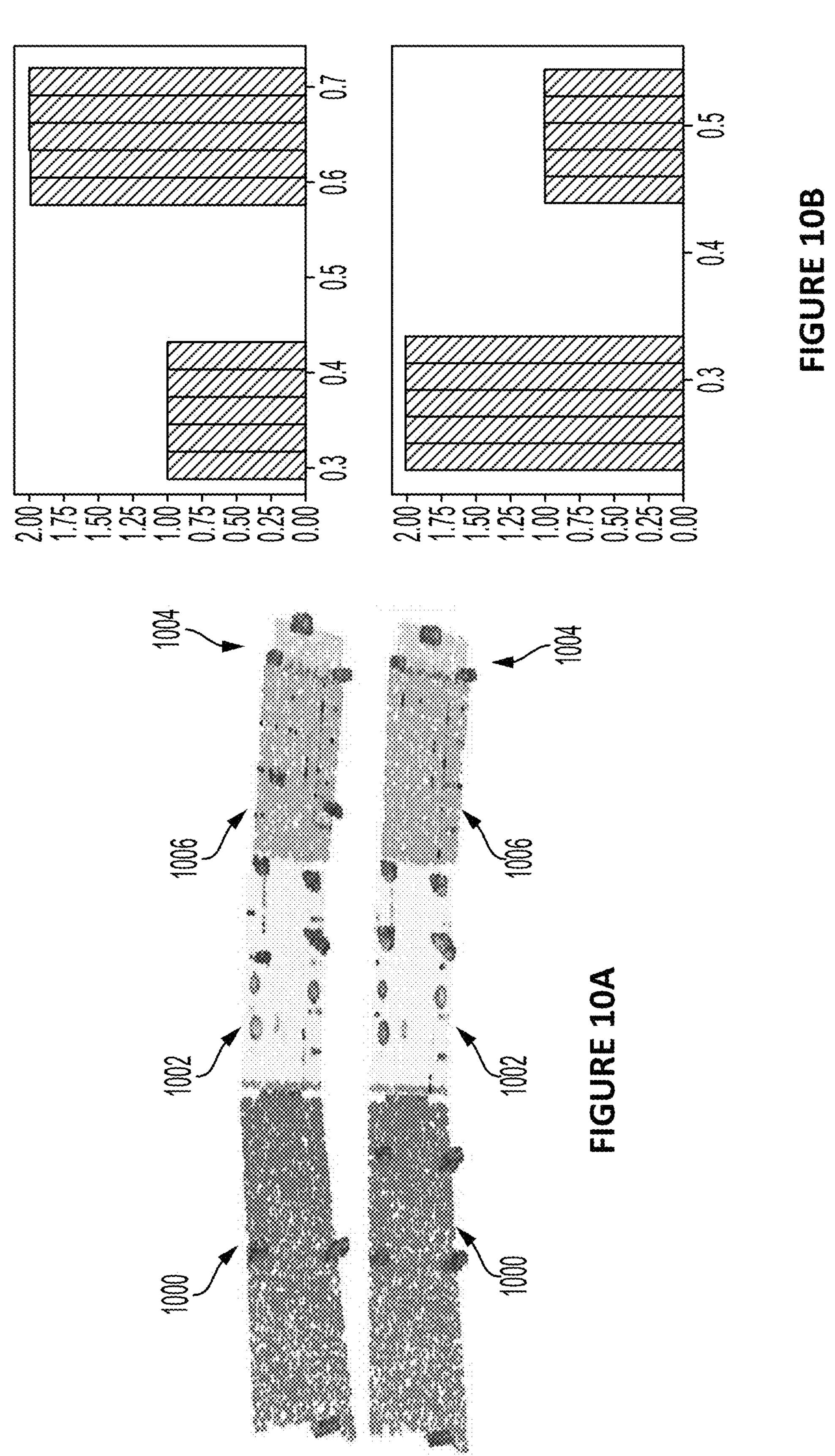
FIGS. 10A and 10B illustrate the same number of brackets at different locations being detected and the corresponding histograms.

FIGS. 10A and 10B illustrate the same number of brackets at different locations being detected and the corresponding histograms. When the same brackets have different locations, the method and system can subdivide the histogram in different regions of the original model. In the example shown in FIGS. 10A and 10B, four major regions may be segmented out (blue 1000, cyan 1002, yellow 1004, and brown 1006). For two subregions (blue 1000 and brown 1006), the system and method (including the segmentation) can detect changes in the number of brackets, although the total bracket number is same. FIGS. 9A-9B and 10A-10B present two types of configuration changes (different number of instances and same number of instances but with different distribution in subregions) that can be detected with the similarity score between two histograms shown in FIG. 10B.

A Real-World Quantitative Use Case

Figures 11F, 11G:
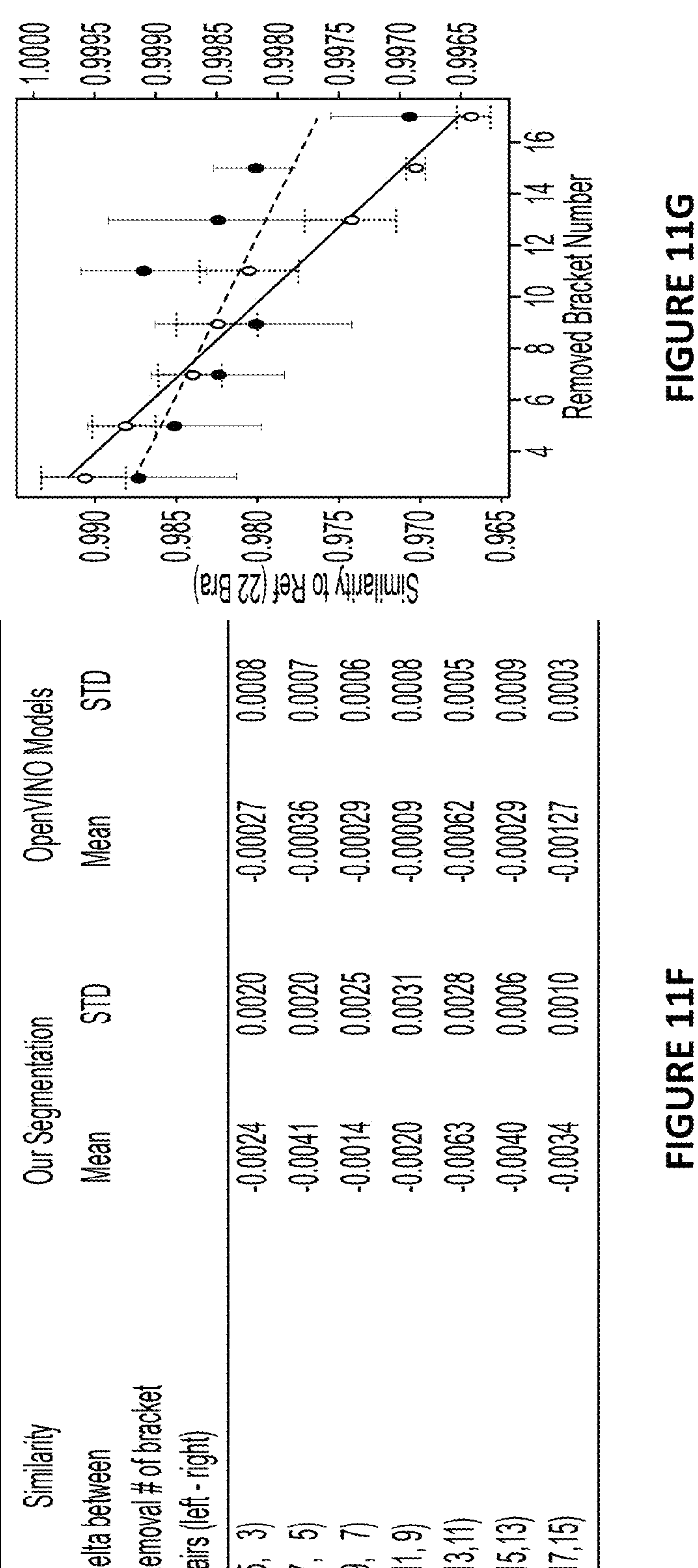

AR training or maintenance inside an airplane (for example, the front cabin of the C130 aircraft head as shown in FIGS. 11A and 11B) requires the detailed content to be automatically selected and loaded using the geometry fingerprint of the interior 3D scene of the airplane. FIG. 11A-11G are a quantitative study of configuration of variation in number of brackets including FIG. 11A showing the internal view of C130 head with arc structure, FIG. 11B showing an external side view of C130 head and FIG. 11C showing the segmentation results of point cloud with black color point cloud being recursively removed as background. FIG. 11D shows a segmented arc structure and FIG. 11E are the histogram of segmentation from 8 different configurations with a different number of brackets. FIG. 11F is a comparison table between the change of correlation of bracket numbers by the disclosed method and latest 3D segmentation deep learning models of open VINO and FIG. 11G shows a linear regression of similarity score calculated between histograms of the various number of brackets removed from arc structure with respect to original arc with all brackets: our method is in solid line and existing reference method is in dashed line. As the table shows, under different configuration (bracket numbers), deformation and noise, the disclosed novel fused recursive segmentation method shows ~1 magnitude better sensitivity and robustness (STD/Mean ratio) than industry state of art 3D deep learning segmentation models.

As shown in FIGS. 11C and 11D, the method may first remove the unchanged background from the arc structure using strong features of windows and then calculate the Wasserstein distance between the segmentation histogram distribution of design configuration of different number of brackets on arc support structure. For example, the lowest 0.967 similarity score (1-Wasserstein distance) in FIG. 11G (x axis=17) is calculated between segmentation histogram of original arc point cloud with all 24 brackets and segmentation histogram of arc with 17 brackets removed. The similar score (1-Wasserstein distance, more information as in supplementary materials) is proportional to the removed bracket number between the paired point clouds. Each error bar is calculated by mean and std from 5 different experiments (applied noise and deformation perturbation to point cloud) and can be linear regression fit to Y=0.99675+−0.00172X with R-squared=0.977. In contrast, results from openVINO state of art 3D segmentation models (plot in thinner red error bar and data in black dots with respect to right side Y axis) has much worse variance with respect to mean and worse linear correlation (dashed line) to configuration change (Y=0.99949+−0.00010793X, with R-squared=0.547). Therefore, the method can automatically identify different configuration/design layout and number of brackets when changes of bracket number on the arc structure are quantitatively calibrated as in FIG. 11. The use case is tested and run on Window 11 desktop with RTX 3080 GPU, Intel i7, 32 G memory and 256 G SSD storage. As recursively hierarchy segmentation can split the 3D point cloud into multiple independent regions which can further leverage multiple parallelly GPU servers through our well established sever based HMD MR pipeline. To achieve close to real time performance, the system can conveniently dispatch recursively segmented clusters to different GPU servers for heavy spatial computation so that the network socket communication speed and latency between servers and HMD device become the up-limit bottleneck when target to solve more challenging point clouds with million vertices. As more and more spatial computation pretrained generic models get published, computation power ramps up, and improvement in loss functions customized in different recursive stage, our method can further support unseen specified or novel defect in heavy 3D models.

While the examples above are for missing brackets or improperly placed brackets (configuration errors), the system and method may be used to detect various other types of anomalies in an object such as a crack in a support substrate member, etc.

Sensitivity Study

Figures 12A, 12B, 12C, 12D:
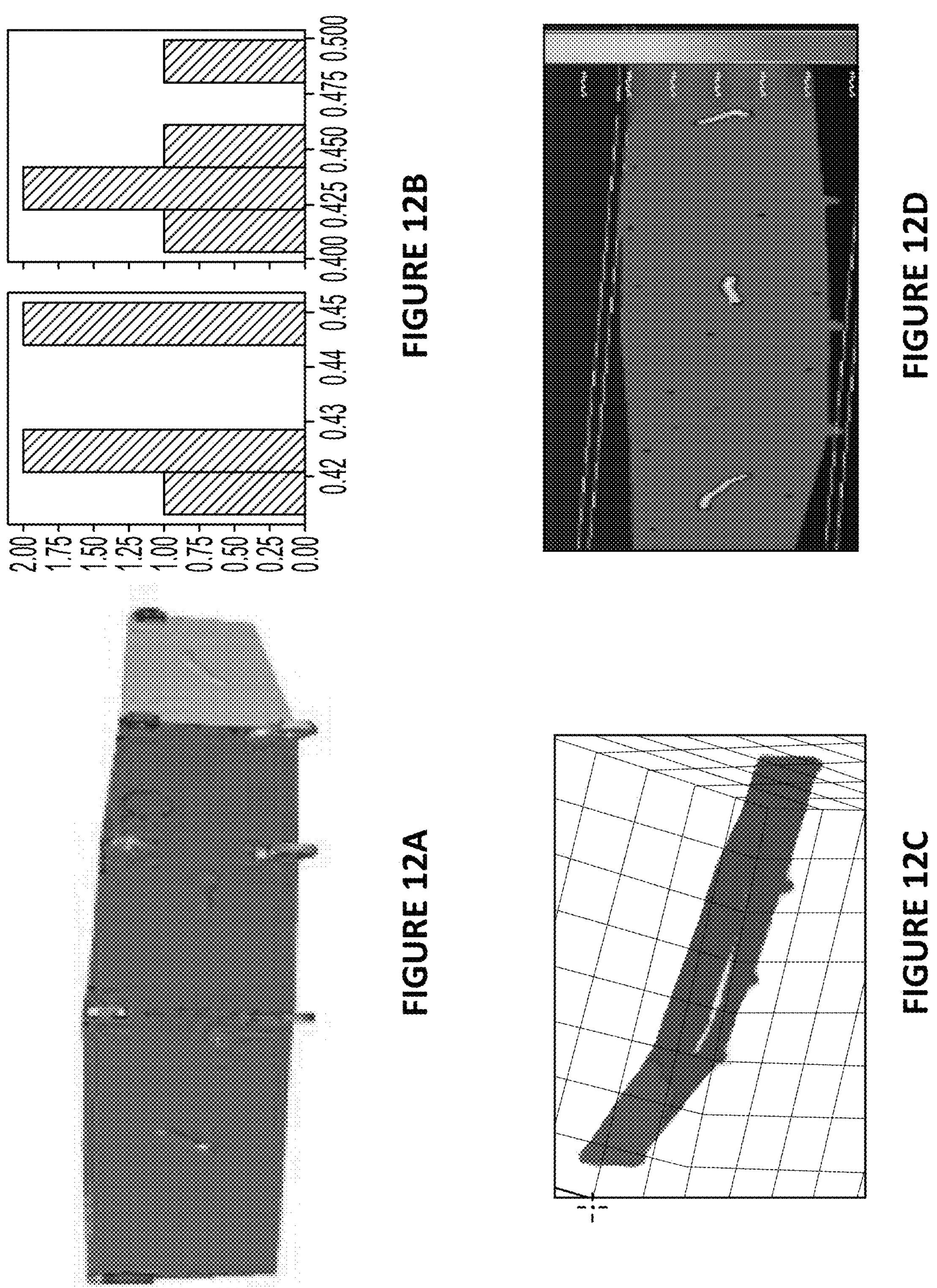
FIGS. 12A-12D show a segmentation sensitivity in an end2end MR (with HL2) study.

FIGS. 12A-12D show a segmentation sensitivity in an end2end MR (with HL2) study with FIG. 12A showing a 5 mm FWHM defect detected by segmentation without alignment as the defect can result in new histogram bin in the cluster with 0.2% changes, FIG. 12B showing a comparison of segmented distribution histogram with and without defects; Left side: the side panel without defects, Right side with defect; segmentation distribution can identify a new instance around 0.45 (normalized to biggest size of ROI clusters recursively detected for defects/brackets), FIG. 12C showing a best defect segmentation results from 12 openVINO latest 3D segmentation models, which are still not able to segment out correct position of challenging trace level defects and FIG. 12D shows defect ground truth verified by rigid alignment based mesh Hausdorff distance.

The system and method can get good quantitative detection on a number of the brackets. Each bracket is roughly ~1% of total point cloud (~300 points out of total 22 k point cloud). To understand the specification of the qualitative limit of defect detection, a sensitivity analysis for 3D defect detection is also conducted. As expected, the sensitivity is dependent on the whole model dimension, performance requirement and geometry complexity. For a typical use case in manufacturing and sustainment, the disclosed method can detect relative change of model within 0.2%. As the following FIGS. 12A-D shows for a 4-meter-long panel, the lowest level that the method can segment out and detect in histogram similarity comparison is 5 mm for the full width at half maximum (FWHM) in depth direction as in FIG. 12.

Comparative Study with Other Opensource Deep Learning Models

Figures 13A, 13B, 13C, 13D:
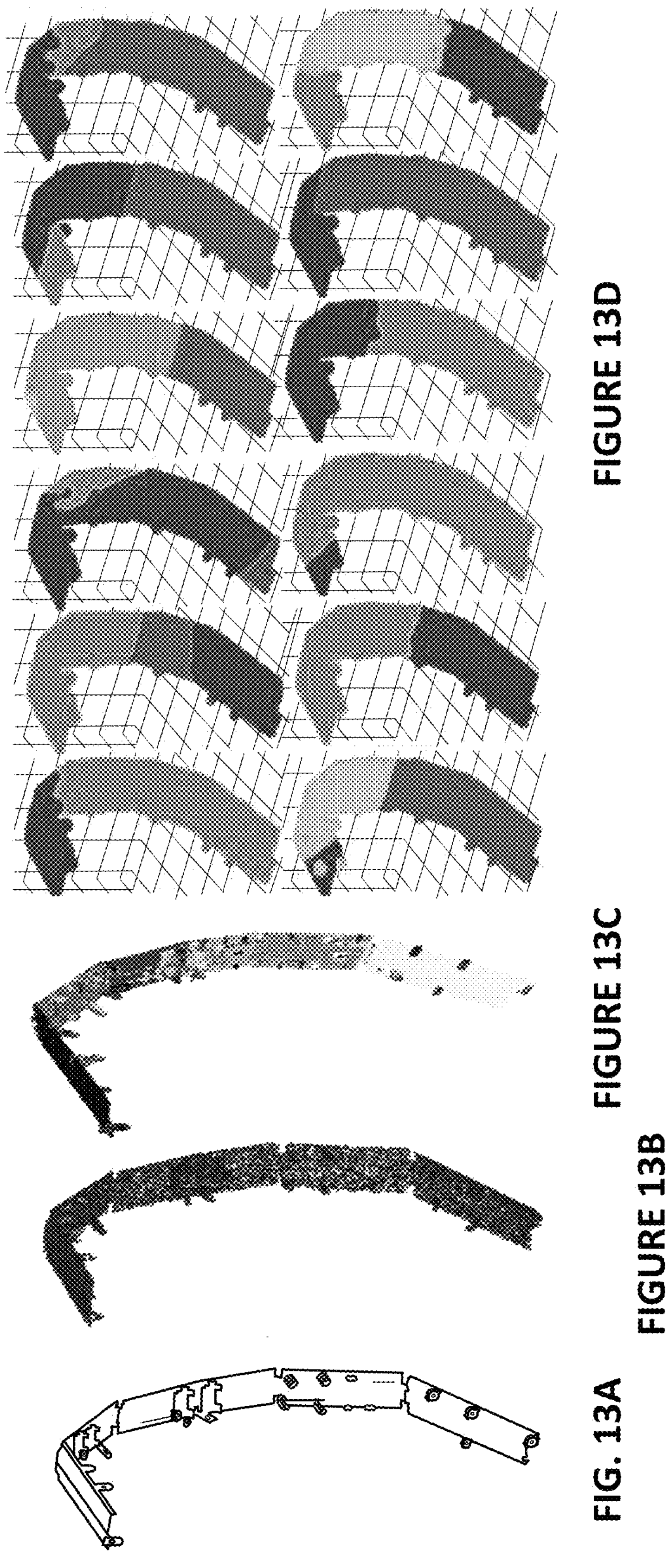
FIGS. 13A-13D are a segmentation comparison between the novel recursive method and OpenVINO pretrained 3D segmentation models.

FIGS. 13A-13D are a segmentation comparison between our recursive method and OpenVINO pretrained 3D segmentation models with FIG. 13A showing a Digital twin CAD model ground truth, FIG. 12B showing a point cloud for 3D segmentation, FIG. 12C showing segmented results from the disclosed novel recursive fusion methods, FIG. 13D showing 3D segmentation results from 12 different OpenVINO deep learning pretrained models in open-source model zoo.

Recently 3D segmentation leverage 2D RGB segmentation, multi-frame projection/pose estimation transformer, point cloud and 3D mesh connection graph, along with computationally expensive deep leaning framework to get semantic point/voxel segmentation, which in general requires enormous training data and does not generalize well to get satisfactory results for unpublic enterprise 3D scenes and nongeneric targets. For example, even for a 2D model, segment everything (SAM) is trained by 11M images and 1.1 billion segmentation masks, and still majorly reply on color and does not work well for 3D geometry defection segmentation on uniform texture surface. The benchmark 3D datasets (S3DIS, LLFF, Co3D etc.) are usually composed of good quality point cloud from high end scanner of common everyday objects, which are not applicable well to enterprise 3D use cases and not from AR edge devices' (Hololens2 etc.) noisy scanning. Generally, for 2D SAM based 3D segmentation model and 2D anomaly detection without the need of training dataset, accuracy of segmentation is dependent on input texture/RGB contrast of surface, which usually not available in geometry based 3D defection as there are no vivid color contrast on most surface of metal components and defects. For enterprise applications, speed, repeatability, and practical flexibility are crucial to land a user-friendly quality product to market. The existing pre-trained 3D geometry model does not generalize and work well in specific real world nongeneric enterprise use cases as we compared in this section. On the other hand, we can flexibly fine tune both deep learning model's feature weight and recursive level balance responsive time requirement and the level of details.

As an industry enterprise deep learning framework, OpenVINO (developed by Intel) is optimizing and deploying open cross platform framework for enterprise AI inference applications. Targeting real world enterprise applications, here we use OpenVINO and its open model zoo as a comparison. As FIGS. 13A-13D shows, 12 off-the-shelf deep learning models from open model zoo majorly focus on common 3D features extracted from internet accessible 3D benchmark training datasets, for unseen data, especially unseen private non-generic enterprise 3D subjects, the generalization is not capable enough to get satisfactory 3D segmentation in enterprise applications.

Figure 14:
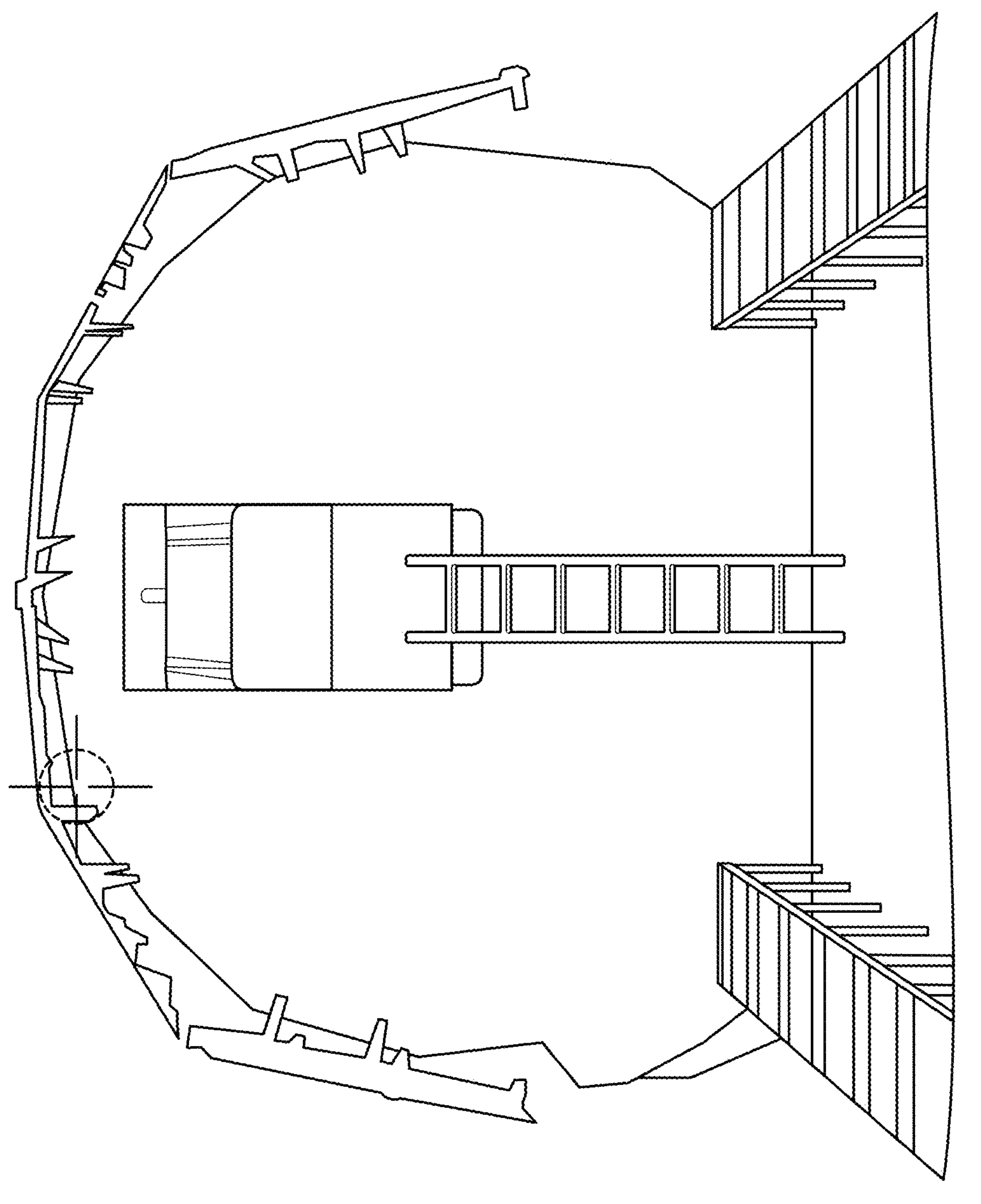
FIG. 14 illustrates an example of an internal 3D aircraft scene with the brackets.

FIG. 14 illustrates an example of an internal 3D aircraft scene with the brackets use case previously described above with reference to FIGS. 11A-11G.

Figures 16A, 16B, 16C, 16D:
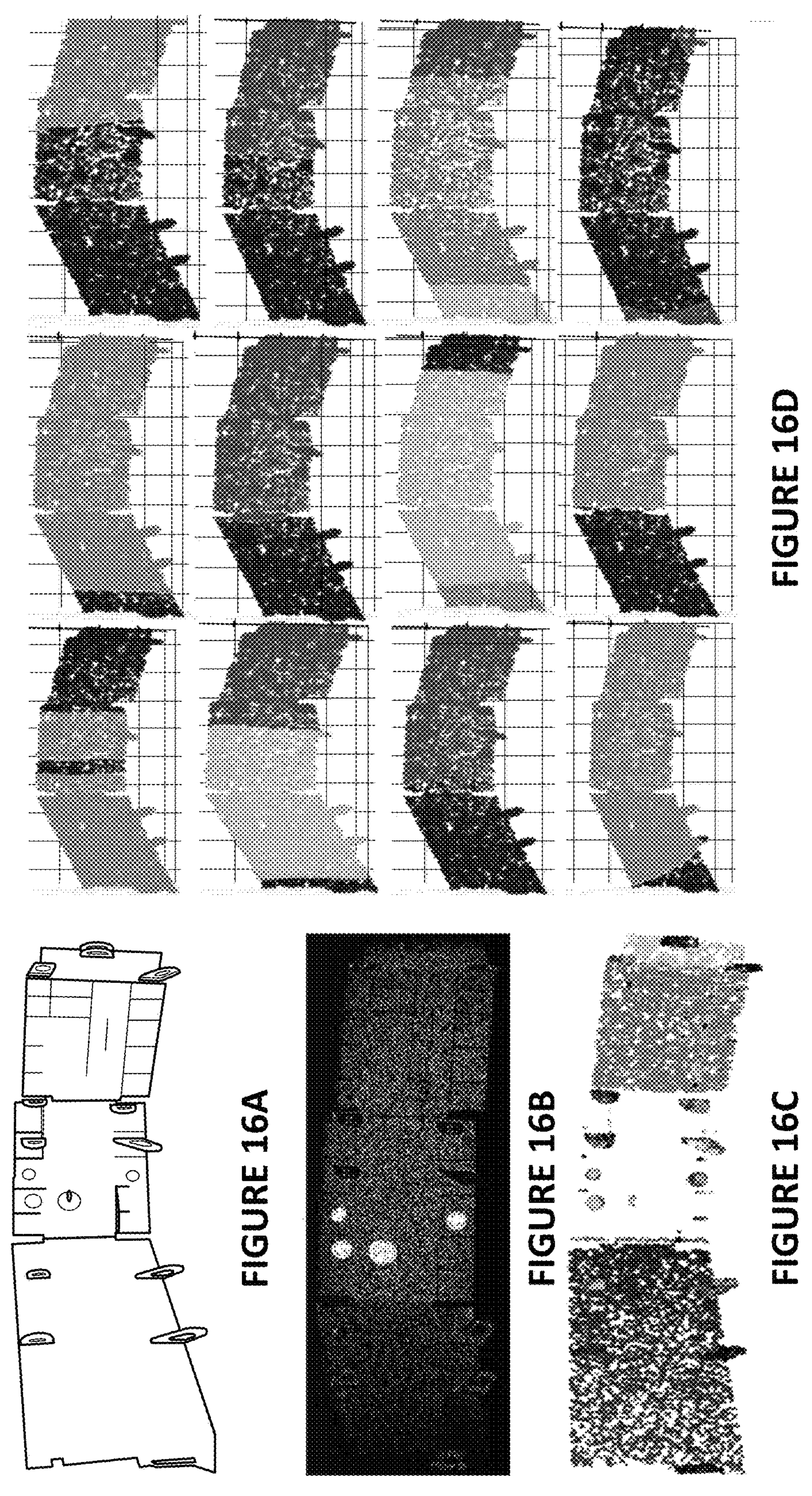
FIGS. 16A-16D illustrates (a) Digital twin CAD model ground truth (b) point cloud input for 3D segmentation (c) segmented results from our recursive fusion methods (d) 3D segmentation results from 12 different OpenVINO deep learning pretrained models in open-source model zoo.
Figures 17A, 17B, 17C, 17D:
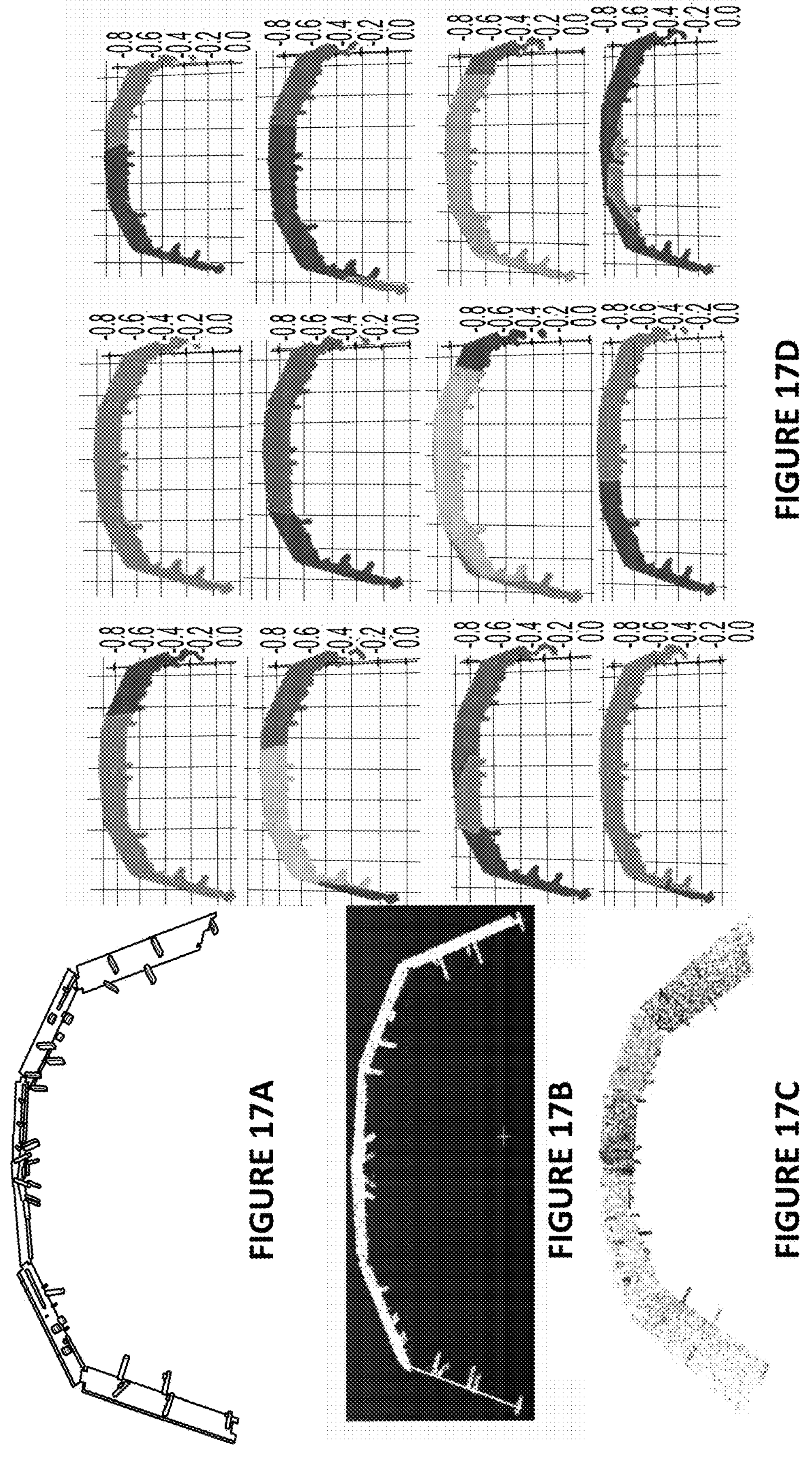
FIGS. 17A-17D illustrates results from a known OpenVINO pretraining segmentation model that shows (a) Digital twin CAD model ground truth (b) point cloud input for 3D segmentation (c) segmented results from our recursive fusion methods (d) 3D segmentation results from 12 different OpenVINO deep learning pretrained models in open-source model zoo.

FIGS. 16A-17D show two additional results comparison cases that compare OpenVINO pretrained segmentation models. In each additional use case, FIGS. 16A and 17A shows a digital twin CAD model ground truth, FIGS. 16B and 17B show a point cloud input for 3D segmentation for each example, FIGS. 16C and 17C show segmentation results for the novel method for each example and FIGS. 16D and 17D show 3D segmentation results from twelve different OpenVINO deep learning pre-trained models.

The system and method provides an automated 3D digital twin learning based inspection system that can track objects and detect defects for enterprise applications, aiming to facilitate both development and user experience. The system and method accomplishes this with minimum few-shot or no need of training datasets for specific non generic defects of interest, free hand acquisition which tolerates various capture poses and lighting conditions without the overlap strictness of the same capture region between 3D point clouds with and without defects, without the need to conduct 3D alignment during defect detection, and without the need to create high quality 3D mesh.

The process first tracks the region or the object of interest and performs segmentation with pre-trained models trained using benchmark generic datasets (shown in FIG. 6), machine learning algorithm or 3D vision segmentation methods in opensource library like open3D, Point Cloud Library (PCL), and then classify and compare segmentation profile distribution to provide a similarity score with respect to the original normal digital twin counterpart, which represents the severity of the defects. The Hausdorff distance mapping of overlap aligned mesh pairs from two different typical sizes of defect objects further confirmed the correctness of our 3D defect detect methods for real world point clouds of 3D scene.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method for anomaly detection, the method comprising:

tracking, on a backend computer system having a processor, an anomaly of an actual object in a 3D scene to generate a mixed reality environment that visualizes the anomaly of the actual object in the mixed reality environment;

training, by the processor, at least two deep learning models using at least one benchmark dataset to generate at least two sets of labels for one or more objects in the 3D scene;

performing, by the processor, recursive cluster segmentation of the one or more objects in the 3D scene to generate at least two sets of histograms of cluster labels for the at least two trained deep learning models;

merging, by the processor, the sets of histograms of cluster labels for the at least two trained deep learning models for each cluster to generate a vector for each cluster;

training, by the processor, a machine learning model based on the merged sets of labels from the at least two trained deep learning models which reduce a complexity of a point cloud of the 3D scene by representing raw RGB and XYZ data of the point cloud in a histogram/distribution of labels of each 3D point; and performing, by the processor using the machine learning model, inference to identify the anomaly in an object of the one or more objects in the 3D scene.

2. The method of claim 1, wherein performing the inference further comprises identifying the anomaly in the object by one of identifying a digital twin and determining if a defect resolution is met.

3. The method of claim 1 further comprising labeling the identified anomaly for visualization.

4. The method of claim 3, wherein labeling the identified anomaly further comprising coloring the identified anomaly.

5. The method of claim 4 further comprising visualizing, on a mixed reality device, the colored identified anomaly.

6. The method of claim 1, wherein training, by the processor, the at least two deep learning models further comprises training, by the processor, a PointCNN model using scannet benchmark data to generate a first set of labels for the 3D scene, training, by the processor, a second PointCNN model using shapenet benchmark data to generate a second set of labels for the 3D scene, training, by the processor, a RandLA model using S3DIS benchmark data to generate a third set of labels for the 3D scene, training, by the processor, a 3DBonet model using the S3DIS benchmark data to generate a fourth set of labels for the 3D scene and training, by the processor, a second 3DBonet model using a few shot training data to generate a fifth set of labels for the 3D scene.

7. The method of claim 6, wherein performing the recursive cluster segmentation further comprises performing, by the processor, recursive cluster segmentation on each set of labels to generate a histogram for each set of labels.

8. The method of claim 1, wherein the anomaly is one of a manufacturing defect, a material defect and a configuration error.

9. A system, comprising:

a computer system having a processor that executes a plurality of lines of computer code, the computer system being configured to:

track an anomaly of an actual object in a 3D scene to generate a mixed reality environment that visualizes the anomaly of the actual object in the mixed reality environment;

train at least two deep learning models using at least one benchmark dataset to generate at least two sets of labels for one or more objects in the 3D scene;

perform recursive cluster segmentation of the one or more objects in the 3D scene to generate at least two sets of histograms of cluster labels for the at least two trained deep learning models;

merge the sets of histograms of cluster labels for the at least two trained deep learning models for each cluster to generate a vector for each cluster;

train a machine learning model based on the merged sets of labels from the at least two trained deep learning models which reduce a complexity of a point cloud of the 3D scene by representing raw RGB and XYZ data of the point cloud in a histogram/distribution of labels of each 3D point; and perform, using the machine learning model, inference to identify the anomaly in an object of the one or more objects in the 3D scene.

10. The system of claim 9, wherein the computer system is further configured to perform the inference by one of the identification of a digital twin and the determination if a defect resolution is met.

11. The system of claim 9, wherein the computer system is further configured to label the identified anomaly for visualization.

12. The system of claim 11, wherein the computer system is further configured to color the identified anomaly.

13. The system of claim 12 further comprising a mixed reality device connected to the computer system that visualizes the colored identified anomaly.

14. The system of claim 13, wherein the mixed reality device is a mixed reality headset.

15. The system of claim 9, wherein the computer system that trains the at least two deep learning models is further configured to train a PointCNN model using scannet benchmark data to generate a first set of labels for the 3D scene, train a second PointCNN model using shapenet benchmark data to generate a second set of labels for the 3D scene, train a RandLA model using S3DIS benchmark data to generate a third set of labels for the 3D scene, train a 3DBonet model using the S3DIS benchmark data to generate a fourth set of labels for the 3D scene and train a second 3DBonet model using a few shot training data to generate a fifth set of labels for the 3D scene.

16. The system of claim 9, wherein the anomaly is one of a manufacturing defect, a material defect and a configuration error.

* * * * *